(12) United States Patent
Ashworth et al.

(10) Patent No.: US 11,031,995 B2
(45) Date of Patent: Jun. 8, 2021

(54) MULTI-USE BOOSTER

(71) Applicant: WILSON ELECTRONICS, LLC, St. George, UT (US)

(72) Inventors: Christopher Ken Ashworth, Toquerville, UT (US); Jeffrey Thomas Gudewicz, Parker, CO (US); Patrick Lee Cook, Cedar City, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/874,520

(22) Filed: May 14, 2020

(65) Prior Publication Data

US 2020/0366362 A1 Nov. 19, 2020

Related U.S. Application Data

(60) Provisional application No. 62/848,127, filed on May 15, 2019.

(51) Int. Cl.
*H04B 7/15* (2006.01)
*H04B 7/26* (2006.01)
*H04B 7/155* (2006.01)
*H04W 16/26* (2009.01)
*H04B 1/04* (2006.01)

(52) U.S. Cl.
CPC ......... *H04B 7/1555* (2013.01); *H04B 1/0483* (2013.01); *H04B 7/15564* (2013.01); *H04W 16/26* (2013.01)

(58) Field of Classification Search
CPC .......... H04B 1/38; H04B 1/3888; H04B 7/15; H04B 7/155
See application file for complete search history.

(56) References Cited

U.S. PATENT DOCUMENTS

| 4,776,032 A | 10/1988 | Odate et al. |
| 5,303,395 A | 4/1994 | Dayani |
| 5,737,687 A | 4/1998 | Martin et al. |
| 5,777,530 A | 7/1998 | Nakatuka |
| 5,835,848 A | 11/1998 | Bi et al. |
| 6,005,884 A | 12/1999 | Cook et al. |

(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pges; Release B, V1.0, Revision E.

(Continued)

*Primary Examiner* — Blane J Jackson
(74) *Attorney, Agent, or Firm* — Thorpe North & Western

(57) ABSTRACT

A repeater system comprises a repeater with a donor port, a server port, and first and second direction amplification paths to amplify one or more RF communication signals coupled between the server and donor ports. A signal splitter is communicatively coupled to the repeater and has first and second signal splitter ports. Signal splitter paths are coupled to the signal splitter ports. The repeater system can be configured to communicate the RF communication signals to a server antenna device on each signal splitter path with a different gain relative to the donor port.

25 Claims, 12 Drawing Sheets

(56) References Cited

U.S. PATENT DOCUMENTS

| | | | |
|---|---|---|---|
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,924,751 B2 * | 4/2011 | Dean | H04B 7/15535 |
| | | | 370/279 |
| 7,974,573 B2 | 7/2011 | Dean | |
| 10,104,818 B2 * | 10/2018 | Nash | H05K 9/0047 |
| 10,236,921 B1 * | 3/2019 | Kohlhepp | H01Q 1/246 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0151775 A1 | 6/2011 | Kang et al. | |

OTHER PUBLICATIONS

ADL5513; "1 MHz to 4 GHz, 80 dB Logarithmic Detector/ Controller"; Data Sheet; (2008); 12 pages; Analog Devices, Inc.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

* cited by examiner

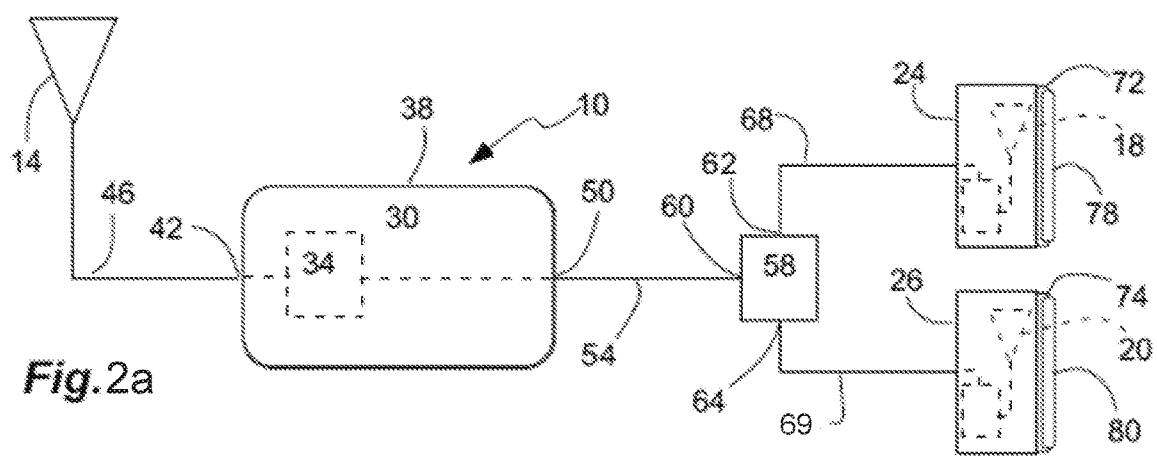
Fig.2a
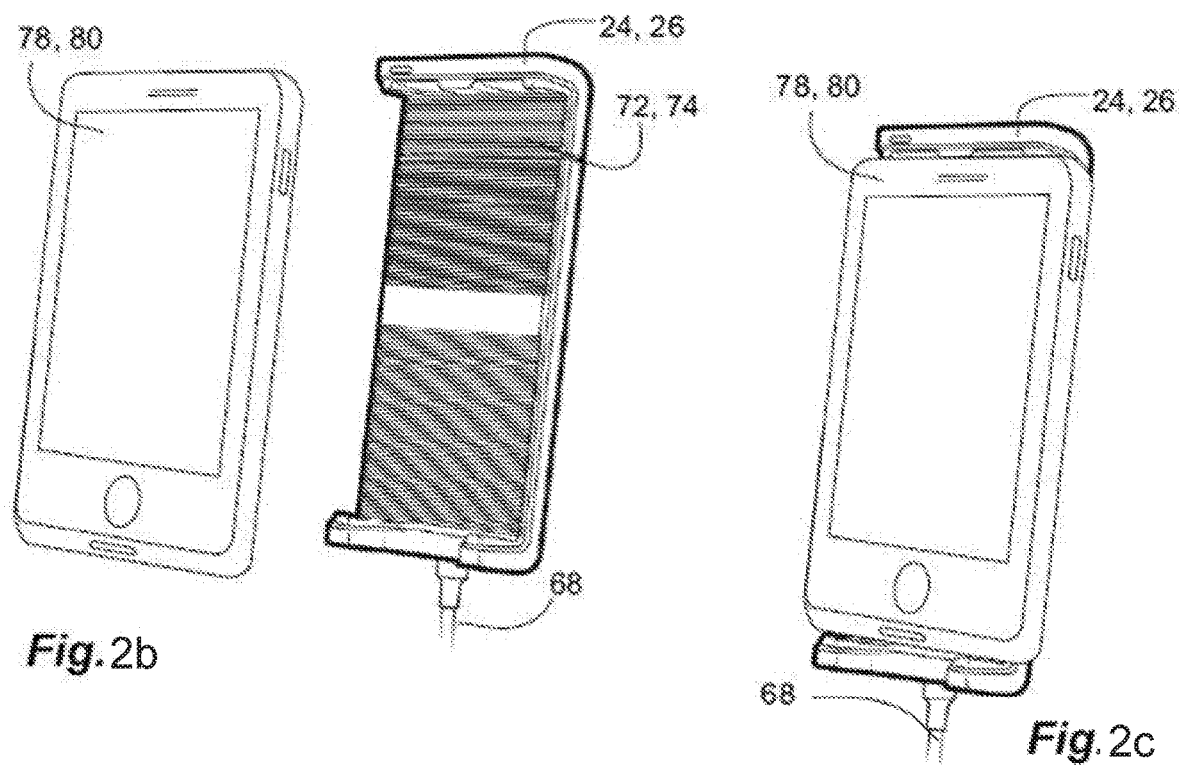
Fig.2b
Fig.2c
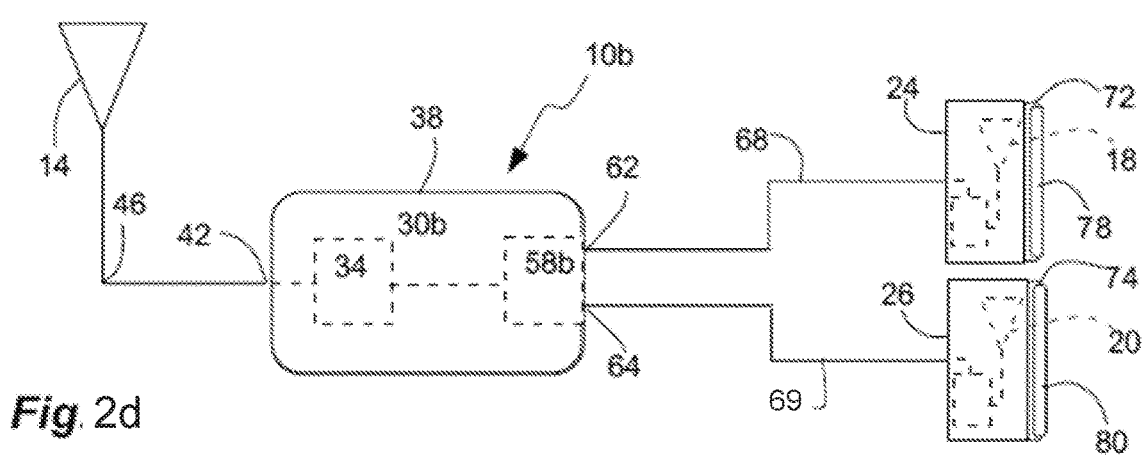
Fig.2d

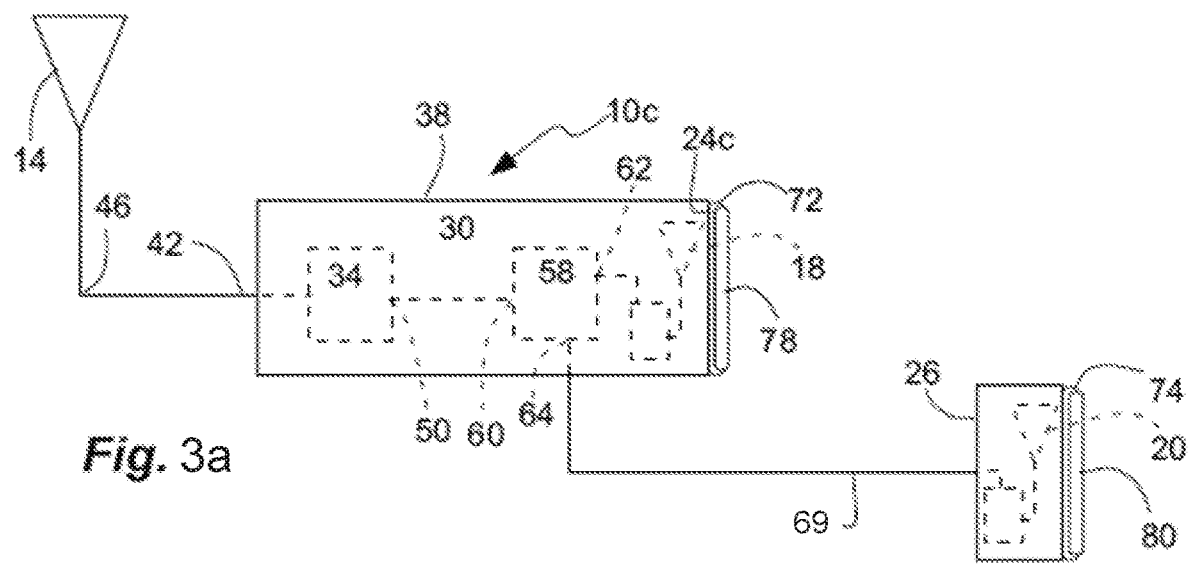
*Fig.* 3a
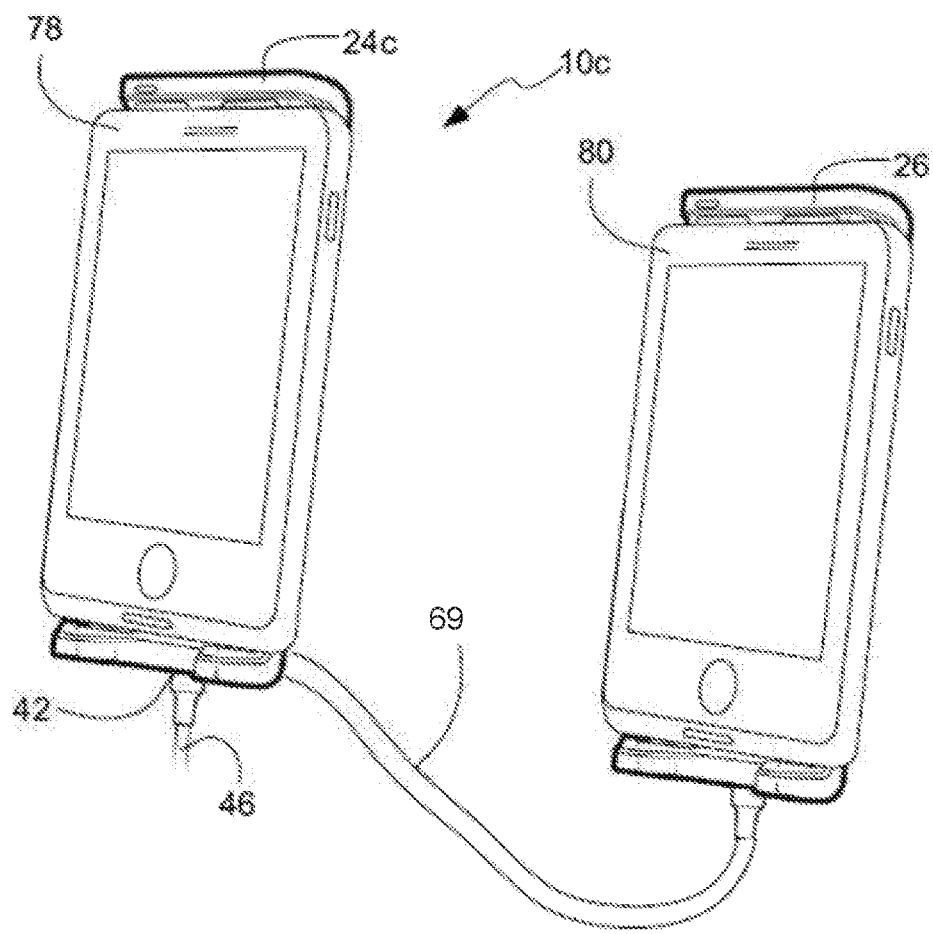
*Fig.* 3b

MULTI-USE BOOSTER

RELATED APPLICATIONS

The present application claims the benefit of U.S. Provisional Patent Application No. 62/848,127 filed May 15, 2019, the entire specifications of which are hereby incorporated by reference in their entirety for all purposes.

BACKGROUND

Wireless communication systems, such as cellular telephone systems, have become common throughout the world. A signal booster or wireless repeater can be used to increase the quality of wireless communication between a wireless device and a wireless communication access point, such as a cell tower. The wireless repeater can improve the quality of the wireless communication by amplifying, filtering, and/or applying other processing techniques to uplink and downlink signals communicated between the wireless device and the wireless communication access point. The uplink channel is generally referred to as the communication direction from one or more wireless user devices to a base station. The downlink channel is generally referred to as the communication direction from the base station to the wireless user device. For a wireless telephone system, the base station may be a cell tower, and the wireless user device may be one or more smart phones, one or more tablets, one or more laptops, one or more desktop computers, one or more multimedia devices such as televisions or gaming systems, one or more cellular internet of things (CIoT) devices, and/or other types of computing devices typically referred to as user equipment (UEs).

As an example, the wireless repeater or signal booster can receive, via an antenna, downlink signals from the wireless communication access point. The wireless repeater or signal booster can amplify the downlink signal and then provide an amplified downlink signal to the wireless device. In other words, the wireless repeater or signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the wireless repeater or signal booster. The wireless repeater or signal booster can amplify the uplink signals before communicating, via an antenna, the uplink signals to the wireless communication access point.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2a is schematic view of a repeater system in accordance with an example;

FIG. 2b is a perspective view of a cradle of the repeater system of FIG. 2a, with a wireless user device, namely a cellular phone, removed from the cradle;

FIG. 2c is a perspective view of the cradle of the repeater system of FIG. 2a, with the wireless user device or the cellular phone carried by the cradle;

FIG. 2d is a schematic view of another repeater system in accordance with another example;

FIG. 3a is a schematic view of another repeater system in accordance with another example;

FIG. 3b is a perspective view of cradles of the repeater system of FIG. 3a, with first and second wireless user devices, namely cellular phones, carried by the cradles;

FIG. 6b is a top view of a cradle of the repeater system of FIG. 6a;

FIG. 6c is a cross-sectional side view of the cradle of the repeater system of FIG. 5a;

Figure 1A:
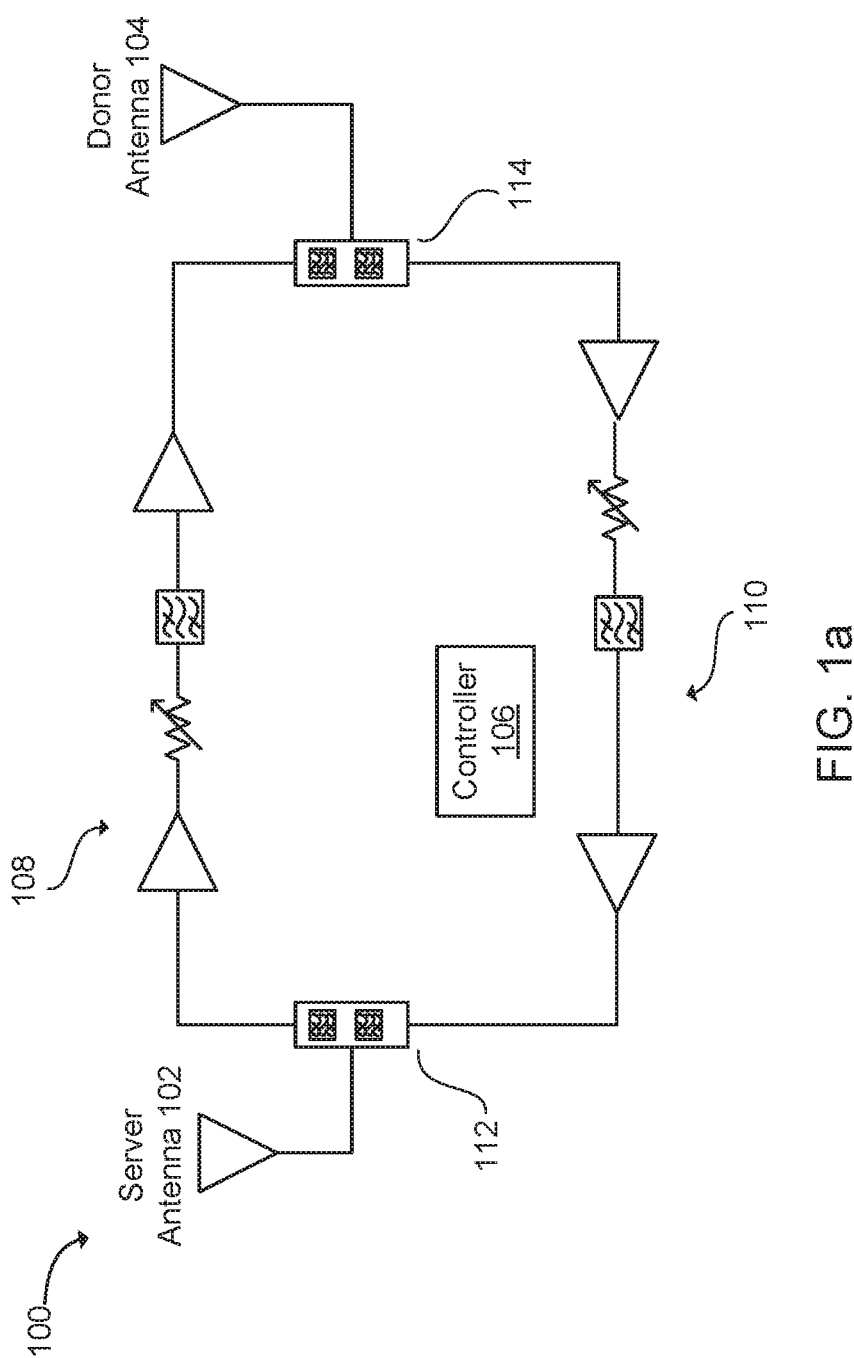
FIG. 1a illustrates a repeater in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless user devices, such as cell phones, can be used in vehicles, such as cars, along with a mobile wireless repeater or signal booster to amplify wireless communication signals. The mobile signal booster or wireless repeater can comprise an exterior donor antenna and an interior server antenna, such as in a cradle that receives the wireless user device. Such mobile wireless repeaters or signal boosters in vehicles can have a limited or relatively small gain level set by a regulatory group such as the Federal Communications Commission. For example, the Federal Communications Commission (FCC) in the United States presently limits the amount of gain a cellular signal booster can apply to a downlink signal in a vehicle to 23 decibels (dB), as measured at an output of the signal booster relative to an input of the signal booster.

Wireless user devices can also be used in stationary locations, such as buildings or stationary vehicles, such as a recreational vehicle (RV), along with a stationary wireless repeater or signal booster to amplify wireless communication signals. The stationary wireless repeater or signal booster can also comprise an exterior donor antenna and an interior server antenna. Such stationary wireless repeaters or signal boosters can have an expanded or relatively greater gain, presently 65-72 dB as determined by the FCC. The greater gain can enable a user to receive a signal throughout the building or stationary vehicle. Recreational vehicles, such as motor homes or travel trailers, provide a particular challenge because they can be both mobile and stationary, and can have greater interior space that can exceed the limited gain provided by typical mobile wireless repeater in the relatively small confines of a vehicle. Therefore, there is a continuing need for improved wireless repeater systems that can provide both limited and expanded signal boosting.

The terms "wireless repeater" and "signal booster" and "cellular signal amplifier" are used interchangeably herein.

The terms "server antenna" and "coupling antenna" are used interchangeably herein. The server antenna can be disposed in a cradle and can form a radio frequency (RF) signal coupler to wirelessly couple one or more RF communication signals to a wireless user device carried by the cradle. In addition, the server antenna can be an inside antenna.

The terms "donor antenna" and "node antenna" are used interchangeably herein. The donor antenna can be an outside antenna. The donor antenna can wirelessly couple one or more RF communication signals to a base station or cell phone tower.

The terms "one or more RF communication signals" and "downlink signal" or "uplink signal" are used herein. The wireless repeater or signal booster can receive, via an antenna, downlink signals from the wireless communication access point. The wireless repeater or signal booster can receive the downlink signal at the donor antenna, amplify the downlink signal and then transmit an amplified downlink signal to the wireless user device via the server antenna. Similarly, uplink signals from the wireless user device (e.g., telephone calls and other data) can be received at the server antenna and directed to the wireless repeater or signal booster. The wireless repeater or signal booster can amplify the uplink signals before communicating, via the donor antenna, the uplink signals to the wireless communication access point.

The term "signal splitter" is used broadly herein to refer to a device that divides an RF communication signal, and can include a tap and a directional coupler. The RF communication signal can be split into two or more different signals using the signal splitter. The division of the RF communication signal can be equal or even as in the case of a signal splitter, or can be uneven as in the case of the tap or the directional coupler. The signal tap can be an uneven splitter that couples some signal off of the signal path. A coupled port receives less of the signal depending upon a coupling factor. An in-line attenuator can be coupled to the coupled port to obtain a desired about of gain or signal power at a specific port, such as at a cradle, direct connect device, or server antenna.

In an example, as illustrated in FIG. 1a, a bi-directional repeater system can comprise a repeater 100 connected to an outside antenna 104 or donor antenna 104 and an inside antenna 102 or server antenna 102. The repeater 100 can include a donor antenna port that can be internally coupled to a second duplexer (or diplexer or multiplexer or circulator or splitter) 114. The repeater 100 can include a server antenna port that can also be coupled to a first duplexer (or diplexer or multiplexer or circulator or splitter) 112. Between the two duplexers, 114 and 112, can be two paths: a first direction amplification and filtering path and a second amplification and filtering path. The first direction amplification and filtering path can comprise a low noise amplifier (LNA) with an input coupled to the first duplexer 112, a variable attenuator coupled to an output of the LNA, a filter coupled to the variable attenuator, and a power amplifier (PA) coupled between the filter and the second duplexer 114. The LNA can amplify a lower power signal without degrading the signal to noise ratio. The PA can adjust and amplify the power level by a desired amount. A second direction amplification and filtering path can comprise an LNA with an input coupled to the second duplexer 114, a variable attenuator coupled to an output of the LNA, a filter coupled to the variable attenuator, and a PA coupled between the filter and the first duplexer 112. The first direction amplification and filtering path can be a downlink amplification path or an uplink amplification path. The second direction amplification and filtering path can be a downlink amplification path or an uplink amplification path. Each amplification and filtering path can include an amplifier chain comprising one or more amplifiers. The one or more amplifiers in the amplifier chain can include the power amplifier. The LNA may or may not be separate from the amplifier chain. The repeater 100 can also comprise a controller 106. In one example, the controller 106 can include one or more processors and memory.

If included in the repeater system 100, the controller 106 can be implemented by any suitable mechanism, such as a program, software, function, library, software as a service, analog or digital circuitry, or any combination thereof. The controller 106 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the one or more amplifiers in the amplifier chain. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

In one configuration, the repeater 220 can be configured to be connected to a device antenna 224 (e.g., an inside antenna, server antenna, or a coupling antenna) and a node antenna 226 (e.g., an outside antenna or donor antenna). The node antenna 226 can receive the downlink signal from the base station 230. The downlink signal can be provided to the signal amplifier 222 via a second coaxial cable 227 or other type of wired, wireless, optical, or radio frequency connection operable to communicate radio frequency signals. The signal amplifier 222 can include one or more radio signal amplifiers for amplification and filtering of cellular signals. The downlink signal that has been amplified and filtered can be provided to the device antenna 224 via a first coaxial cable 225 or other type of radio frequency connection operable to communicate radio frequency signals. The device antenna 224 can communicate the downlink signal that has been amplified and filtered to the wireless device 210.

Similarly, the device antenna 224 can receive an uplink signal from the wireless device 210. The uplink signal can be provided to the signal amplifier 222 via the first coaxial cable 225 or other type of wired, wireless, optical, or radio frequency connection operable to communicate radio frequency signals. The signal amplifier 222 can include one or more radio signal amplifiers for amplification and filtering of cellular signals. The uplink signal that has been amplified and filtered can be provided to the node antenna 226 via the second coaxial cable 227 or other type of wired, wireless, optical, or radio frequency connection operable to communicate radio frequency signals. The node antenna 226 can communicate the uplink signal that has been amplified and filtered to a node, such as base station 230.

In one embodiment, the device antenna 224 and the node antenna 226 can be integrated as part of the repeater 220. Alternatively, the repeater 220 can be configured to be connected to a separate device antenna 224 or node antenna 226. The device antenna and the node antenna may be provided by a different provider than the repeater 220.

Figure 1B:
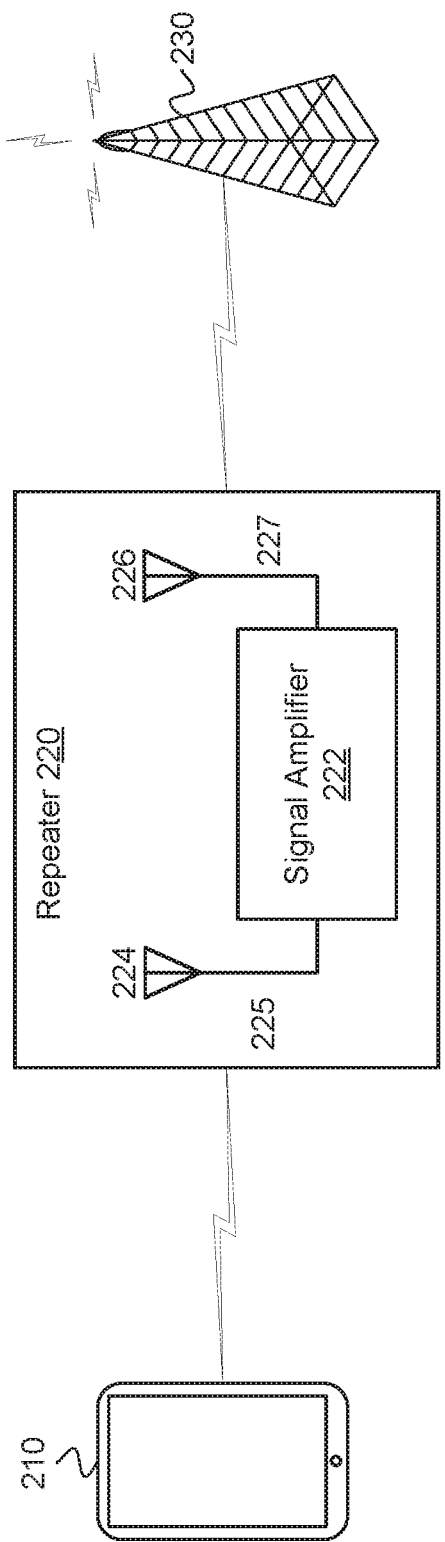
FIG. 1b illustrates a repeater in communication with a user equipment (UE) and a base station (BS) in accordance with an example.

In one example, the repeater 220 can send uplink signals to a node and/or receive downlink signals from the node. While FIG. 1b shows the node as a base station 230, this is not intended to be limiting. The node can comprise a wireless wide area network (WWAN) access point (AP), a base station (BS), an evolved Node B (eNB), a next generation Node B (gNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 220 used to amplify the uplink and/or a downlink signal can be a handheld booster. The handheld booster can be implemented in a sleeve of the wireless device 210. The wireless device sleeve may be attached to the wireless device 210, but may be removed as needed. In this configuration, the repeater 220 can automatically power down or cease amplification when the wireless device 210 approaches a particular base station. In other words, the repeater 220 may determine to stop performing signal amplification when the quality of uplink and/or downlink signals is above a defined threshold based on a location of the wireless device 210 in relation to the base station 230.

In one example, the repeater 220 can include a battery to provide power to various components, such as the signal amplifier 222, the device antenna 224, and the node antenna 226. The battery can also power the wireless device 210 (e.g., phone or tablet). Alternatively, the repeater 220 can receive power from the wireless device 210.

Figure 1C:
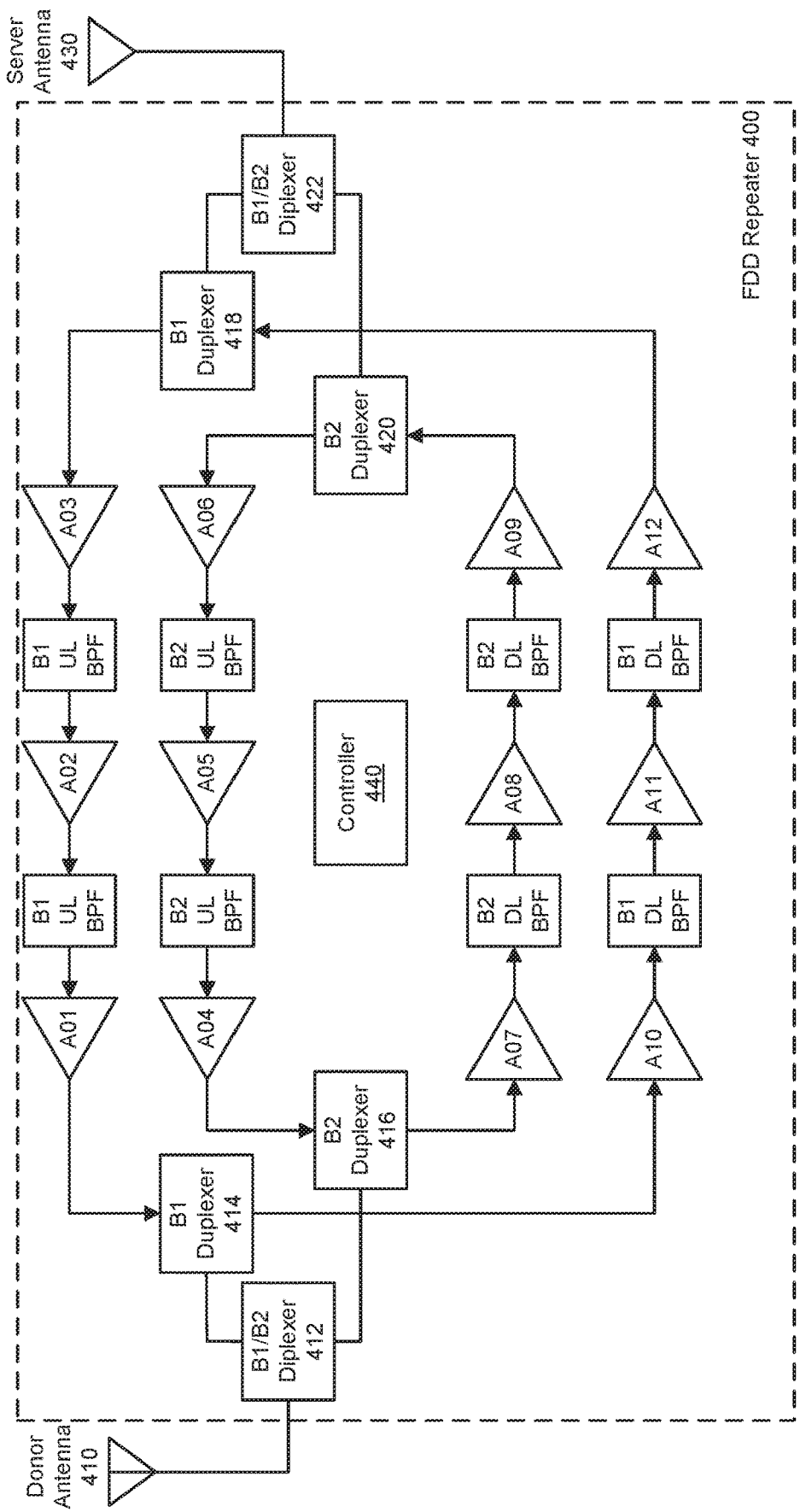
FIG. 1c illustrates a frequency division duplex (FDD) multiband repeater in accordance with an example.

As illustrated in FIG. 1c, in another example, a repeater can be configured as a multiband bi-directional frequency division duplex (FDD) repeater 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path. In the example of FIG. 1c, a first band is labeled as Band 1 (B1) and a second band is labeled as Band 2 (B2). The labeling is intended to be generic, and does not represent specific bands, such as 3GPP band 1 and band 2.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

Figure 1D:
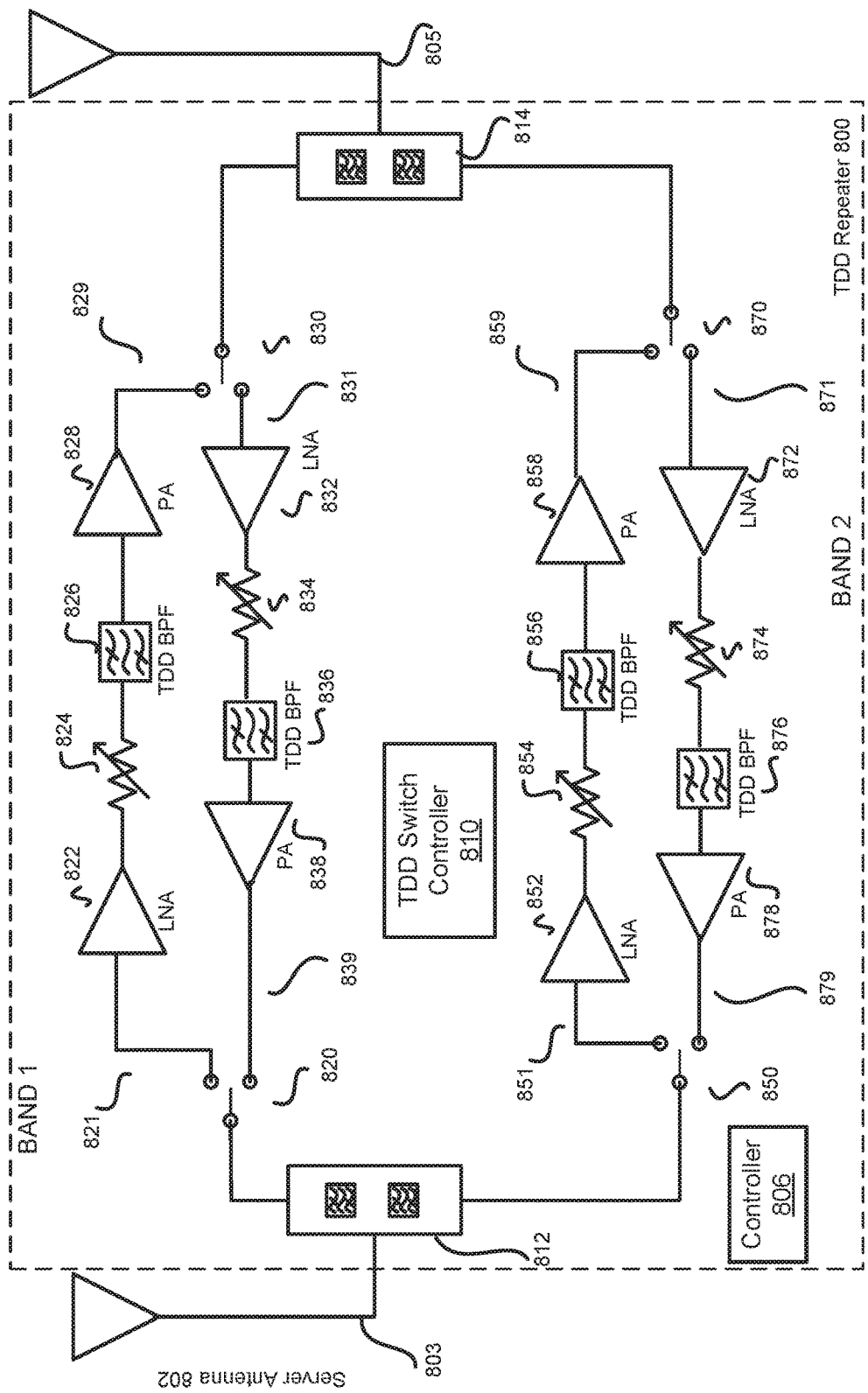
FIG. 1d illustrates a time division duplex (TDD) multiband repeater in accordance with an example.

In another example, as illustrated in FIG. 1d, the repeater can be a single band or multi-band Time Division Duplex (TDD) repeater 800. FIG. 1d provides an example illustration of a multi-band TDD repeater. The multi-band TDD repeater can be configured to receive, filter, amplify, and transmit TDD UL and DL signals. A TDD UL signal and TDD DL signal of the same band typically occupy the same bandwidth.

The multi-band TDD repeater illustrated in FIG. 1d can comprise a first port 803 (e.g., a server port, a device port, or an inside port) and a second port 805 (e.g., a donor port, a node port, or an outside port). The first port 803 can be configured to be coupled to a first antenna 802 (a server antenna). The first antenna 802 can be configured to receive a first-direction signal (e.g., an uplink signal) from a wireless device and transmit a second-direction signal (e.g., a downlink signal) to a wireless device. The second port 805 can be configured to be coupled to a second antenna 804 (a donor antenna). The second antenna 804 can be configured to transmit a first-direction signal (e.g., an uplink signal) to a base station (e.g., an evolved node B (eNB), a new radio (NR) node B (gNB), or an NR base station (NR BS)) and receive a second-direction signal (e.g., a downlink signal) from a base station. The repeater can also comprise a controller 806. In one example, the controller 806 can include one or more processors and memory.

In another example, the first port 803 can be configured to be coupled to a multiplexer 812 (or a diplexer, a duplexer, a circulator, or a splitter). The multiplexer 812 can be configured to be coupled to a first switch 820 and a third switch 850. The first switch 820 can be configured to be coupled to a first-direction path (e.g., an uplink path) 821, and a second-direction path (e.g., a downlink path) 839. The third switch 850 can be configured to be coupled to a first-direction path (e.g., a uplink path) 851, and a second-direction path (e.g., a downlink path) 879. A first-direction signal received at the first port 803 can be directed to the multiplexer 812. The multiplexer 812 can direct the first-direction signal, based on its frequency, to the first switch 820 or the third switch 850.

In another example, the second port 805 can be configured to be coupled to a multiplexer 814 (or a diplexer, a duplexer, a circulator, or a splitter). The multiplexer 814 can be configured to be coupled to a second switch 830 and a fourth switch 870. The third switch 830 can be configured to be coupled to the first-direction path (e.g., an uplink path) 829 and the second-direction path (e.g., a downlink path) 831. The fourth switch 870 can be configured to be coupled to the first-direction path (e.g., an uplink path) 859 and the second-direction path (e.g., a downlink path) 871. A second-direction signal received at the second port 805 can be directed to the multiplexer 814. The multiplexer 814 can direct the second-direction signal, based on its frequency, to the second switch 830 or the fourth switch 870. One or more of the first switch 820, the second switch 830, the third switch 850, or the fourth switch 870 can comprise one or more single-pole double-throw switches.

In another example, a first-direction signal can be directed from the first switch 820. The first switch 820 can be configured to direct the first-direction signal to a first-direction path of the first path 821. The first-direction path of the first path 821 can comprise one or more of: one or more low noise amplifiers (LNAs) 822, one or more variable attenuators 824, one or more filters 826, or one or more power amplifiers (PAs) 828. The one or more PAs 828 can comprise: a variable gain amplifier, a fixed-gain power amplifier, or a gain block. The one or more filters 826 can be configured to pass one or more of a first-direction (e.g., an uplink direction) of a first frequency range (e.g., 3GPP LTE TDD frequency bands or 3GPP NR TDD Frequency bands). In another example, the one or more filters 826 can be configured to pass one or more of a first-direction (e.g., an uplink direction) of the 3GPP LTE TDD frequency bands, or 3GPP NR TDD frequency bands. In another example, the one or more filters 826 can be configured to pass a selected channel within a 3GPP TDD band. The first direction can be an uplink direction.

In another example, after being directed along the first-direction path of the first path, a first-direction signal of the first frequency range can be amplified and filtered in accordance with the type of amplifiers and filters including along the first-direction path of the first path. The first-direction signal can be further directed from the first path 829 to the second switch 830. The second switch 830 can be configured to direct the first-direction signal to the multiplexer 814. The first-direction signal can be directed from the multiplexer 814 to the second port 805. The first-direction signal can be directed from the second port 805 to the second antenna 804.

In another example, a second-direction signal can be directed from the second switch 830. The second switch 830 can be configured to direct the second-direction signal to the second-direction path of the first path 831. The second-direction path of the first path 831 can comprise one or more of: one or more low noise amplifiers (LNAs) 832, one or more variable attenuators 834, one or more filters 836, or one or more power amplifiers (PAs) 838. The one or more PAs 838 can comprise: a variable gain amplifier, a fixed-gain power amplifier, or a gain block. The one or more filters 836 can be configured to pass one or more of a second-direction (e.g., a downlink direction) of a first frequency range (e.g., 3GPP LTE TDD frequency bands). In another example, the one or more filters 836 can be configured to pass one or more of a second-direction (e.g., a downlink direction) of 3GPP LTE TDD frequency bands, or 3GPP NR TDD frequency bands. In another example, the one or more filters 836 can be configured to pass a selected channel within a 3GPP TDD band. The second-direction can be a downlink direction.

In another example, after being directed along the second-direction path of the first path, a second-direction signal of the first frequency range can be amplified and filtered in accordance with the type of amplifiers and filters including along the second-direction path of the first path. The second-direction signal can be further directed from the first path 839 to the first switch 820. The first switch 820 can be configured to direct the second-direction signal to the multiplexer 812. The second-direction signal can be directed from the multiplexer 812 to the first port 803. The second-direction signal can be directed from the first port 803 to the first antenna 802.

In another example, a second-direction signal can be directed from the fourth switch 870. The fourth switch 870 can be configured to direct the second-direction signal to the second-direction path of the second path 871. The second-direction path of the second path 871 can comprise one or more of: one or more low noise amplifiers (LNAs) 872, one or more variable attenuators 874, one or more filters 876, or one or more power amplifiers (PAs) 878. The one or more PAs 878 can comprise: a variable gain amplifier, a fixed-gain power amplifier, or a gain block. The one or more filters 876 can be configured to pass one or more of a second-direction (e.g., a downlink direction) of a second frequency range (e.g., 3GPP LTE TDD frequency bands). In another example, the one or more filters 876 can be configured to pass one or more of a second-direction (e.g., a downlink direction) of 3GPP LTE TDD frequency bands, or 3GPP NR TDD frequency bands. In another example, the one or more filters 876 can be configured to pass a selected channel within a 3GPP TDD band. The second-direction can be a downlink direction.

In another example, after being directed along the second-direction path of the second path, a second-direction signal of the second frequency range can be amplified and filtered in accordance with the type of amplifiers and filters including along the second-direction path of the second path. The second-direction signal can be further directed from the second path 879 to the third switch 850. The third switch 850 can be configured to direct the second-direction signal to the multiplexer 812. The second-direction signal can be directed from the multiplexer 812 to the first port 803. The second-direction signal can be directed from the first port 803 to the first antenna 802.

In another example, a first-direction signal can be directed from the third switch 850. The third switch 850 can be configured to direct the first-direction signal to a first-direction path of the second path 851. The first-direction path of the second path 851 can comprise one or more of: one or more low noise amplifiers (LNAs) 852, one or more variable attenuators 854, one or more filters 856, or one or more power amplifiers (PAs) 858. The one or more PAs 858 can comprise: a variable gain amplifier, a fixed-gain power amplifier, or a gain block. The one or more filters 856 can be configured to pass one or more of a first-direction (e.g., an uplink direction) of a second frequency range (e.g., 3GPP LTE TDD frequency bands). In another example, the one or more filters 856 can be configured to pass one or more of a first-direction (e.g., an uplink direction) of 3GPP LTE TDD frequency bands, or 3GPP NR TDD frequency bands. In another example, the one or more filters 856 can be configured to pass a selected channel within a 3GPP TDD band. The first direction can be an uplink direction.

In another example, after being directed along the first-direction path of the second path, a first-direction signal of the second frequency range can be amplified and filtered in accordance with the type of amplifiers and filters including along the first-direction path of the second path. The first-direction signal can be further directed from the second path 859 to the fourth switch 870. The fourth switch 870 can be configured to direct the first-direction signal to the multiplexer 814. The first-direction signal can be directed from the multiplexer 814 to the second port 805. The first-direction signal can be directed from the second port 805 to the second antenna 804.

One or more TDD switch controllers 810 can be configured to switch the first switch 820 and the second switch 830 between a DL configuration and an UL configuration in a 1 millisecond (ms) subframe basis for 3GPP LTE. The one or more TDD switch controllers 810 can be configured to switch the first switch 820 and the second switch 830 between a DL configuration and an UL configuration on a symbol basis for 3GPP 5G, wherein the duration of a symbol can vary based on numerology.

One or more TDD switch controllers 810 can be configured to switch the third switch 850 and the fourth switch 870 between a DL configuration and an UL configuration in a 1 millisecond (ms) subframe basis for 3GPP LTE. The one or more TDD switch controllers 810 can be configured to switch the third switch 850 and the fourth switch 870 between a DL configuration and an UL configuration on a symbol basis for 3GPP 5G, wherein the duration of a symbol can vary based on numerology.

In another example, a repeater can comprise m additional first-direction filtering and amplification paths configured to be coupled between the first port 803 and the second port 805, wherein each of the m additional first-direction filtering and amplification paths can be configured to filter a first-direction signal of a selected frequency range. The selected frequency range can include 3GPP LTE TDD frequency bands 33-53, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster).

In another example, a repeater can comprise n additional second-direction filtering and amplification paths configured to be coupled between the first port 803 and the second port 805, wherein each of the n additional second-direction filtering and amplification paths can be configured to filter a second-direction signal of a selected frequency range. The selected frequency range can include 3GPP LTE TDD frequency bands 33-53, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster).

In one example, a repeater system can provide at least a pair of signal paths between an exterior donor antenna and at least a pair of server antennas, or at least a pair of server ports. At least one of the server antennas can be part of a cradle with an interface capable of receiving and carrying a wireless user device, such as a cellular phone or a wireless hot spot, such as a jet pack or a MiFi. In one aspect, another of the server antennas can be part of the cradle with a second interface capable of receiving a second wireless user device. The repeater system can have a signal splitter to split one or more RF communication signals between the first and second server antennas in the first and second interfaces of the cradles. The wireless hot spot can be configured to broadcast and receive WiFi signals to user devices and convert the WiFi signal to a cellular signal for communication with a cellular base station via the donor antenna.

The repeater system can be configured to provide a maximum gain at a predetermined location within the repeater system relative to an input signal. For example, a downlink signal received at a donor antenna can be communicated to a donor port of a repeater in the repeater system. The gain of the repeater in the repeater system can be measured relative to the donor port. The gain can be measured at one or more of: an output of a server port of the repeater; an input to a signal splitter coupled to the server port of the repeater; an output at two or more ports of the signal splitter; or an input to an antenna, a cradle, or a direct connect device coupled to signal splitter. The antenna can be a coupling antenna or a server antenna. It should be noted that the maximum gain of the repeater system does not include cradle coupling loss or antenna gain.

Example gains are provided for certain environments in which the repeater system is configured to operate. The example gains provided herein are for a regulatory system, such as the requirements provided by the FCC. The example gains are not intended to be limiting. Rather, they are provided as examples of different gains for different operating environments including, but not limited to, a gain set for: a direct connect device (15 dB), a cradle (23 dB), a server antenna operating a moving vehicle (50 dB), and a stationary server antenna (65-72 dB). The actual gain levels provided by the repeater(s) in the repeater system can be determined by the regulatory agency in which the repeater system is operating and/or is designed to operate in.

In another aspect, one server antenna can be a stationary interior server antenna, and the signal splitter can be a signal tap splitting the one or more RF communication signals disproportionately between a coupled signal path to the first server antenna at the cradle, and a second signal path to the second or stationary interior server antenna. Thus, the signal tap can be configured to provide a maximum gain of 23 dB at the first antenna of the cradle, and a maximum gain of between 65-72 dB at the second or stationary interior server antenna.

In another aspect, the signal tap can be configured to provide a maximum gain, relative to the signal at the donor port, of 23 dB at the first server port (to the first server antenna of the first cradle), and a maximum gain of between 65-72 dB at the second server port (to the second or stationary interior server antenna). Such a configuration can be suited for a recreational vehicle (RV) that is both mobile and stationary, while complying with regulatory rules, such as the FCC rules limiting gain. Thus, the repeater system can be disposed in the vehicle or RV, and coupled to an exterior donor antenna.

In another aspect, the signal splitter or tab can be integrated into a repeater comprising a first direction amplification and filtering path, a second direction amplification and filtering path, and other components, and the repeater can provide at least a pair of server ports for the first and second server antennas of the cradles, direct connect device, or the first server antenna of the cradle, and the second mobile or stationary interior server antenna.

In one example, the repeater can be configured to provide two different maximum system gains. For example, a signal tap can be used to provide a signal at one server port that is substantially less than a signal at another server port, such that the maximum system gain at each server port is compliant with the FCC or regulatory body maximum system gain rules for the component coupled to that server port (i.e. cradle, direct connect device, mobile server antenna, and/or stationary server antenna).

FIGS. 2a-2c depict an example of a repeater system 10 or signal booster in an example of the invention. The repeater system 10 can boost or amplify one or more radio frequency (RF) communication signals between a donor antenna port 42 configured to be coupled to a donor antenna 14 and one or more server antenna ports 62, 64, configured to be coupled to server antennas, such as first and second server antennas 18 and 20, respectively. The donor antenna 14 can be an exterior donor antenna disposed outside of a vehicle or structure. In one aspect, the server antennas 18 and 20 can be first and second RF signal couplers carried by and disposed in first and second cradles 24 and 26 associated with the repeater system 10.

The repeater system 10 can comprise a repeater 30, the first and second cradles 24 and 26 with the first and second server antennas 18 and 20 or first and second RF signal couplers, and the donor antenna 14. The repeater 30 can comprise a bi-directional amplifier (BDA) 34 having at least a first direction amplification and filtering path and a second direction amplification and filtering path configured to amplify the one or more RF communication signals, as previously discussed with respect to FIGS. 1a-1d. The repeater 30 can be single band or multiband, an FDD repeater, a TDD repeater, or a combined FDD/TDD repeater. The repeater can improve the quality of wireless communication of the one or more RF communication signals by amplifying, filtering, and/or applying other processing techniques via the BDA 34. The repeater 30 can be disposed in a desired location, such as inside an RV, vehicle, structure, or the like.

The repeater 30 includes a donor port 42 coupled to the BDA 34. The donor port is configured to enable the donor antenna 14 to be coupled to the repeater 30. In one aspect, the donor port 42 can be a co-axial coupler carried by the housing 38 and coupled to a co-axial cable 46 associated with the donor antenna 14, or other type of radio frequency connection operable to communicate radio frequency signals. The repeater 30 can also have a server port 50. The server port 50 can be communicatively coupled to the BDA 34. In one aspect, the server port 50 can be a co-axial coupler carried by the housing 38 and coupled to one or more co-axial cables 54 associated with the cradles 24 and 26, or the signal splitter 58 described below. In another aspect, the server port 50 can be an electrical connection between the repeater 30 and external devices, such as the cradles 24 and 26 or a similar device having one or more RF coupling antennas configured to couple to a user device antenna, a direct connect device, or a server antenna, via the signal splitter 58.

The signal splitter 58 is communicatively coupled to the repeater 30. In one aspect, the signal splitter 58 can be coupled to the server port 50. In another aspect, the signal splitter 58b can be integrated into the repeater 30b, as shown in FIG. 2d, and as described below. The signal splitter 58 can have first and second signal splitter ports 62 and 64, respectively. The first and second signal splitter ports 62 and 64 can be first and second server ports, or the signal splitter 58 can split the server port 50 into first and second server ports. In one aspect, the first and/or second signal splitter ports 62 and 64 can be co-axial couplers carried by the signal splitter 58, or housing thereof, and coupled to co-axial cables 68 and 69 associated with the cradles 24 and 26, or other type of radio frequency connection operable to communicate radio frequency signals. In another aspect, the first and/or second signal splitter ports 62 and 64 can be electrical connections between the signal splitter 58 and the cradles 24 and 26, or electrical components thereof, such as the antennas 18 and 20.

The signal splitter 58 can direct the one or more RF communication signals between the first and second signal splitter ports 62 and 64, the first and second cradles 24 and 26, and the first and second server antennas 18 and 20 or the first and second RF signal couplers 62, 64. In one aspect, the signal splitter 58 can evenly divide the one or more RF communication signals. The signal splitter 58, and the repeater 30, can be configured so that signal measured at the signal splitter 58 has a predetermined maximum gain at the first and/or second signal splitter ports 62 and 64, relative to the signal at the input port, such as port 42. For example, the signal splitter 58, and the repeater 30, can be configured to provide a maximum gain of 23 dB at the first and second antennas 18 and 20 or at the first and second RF signal splitter ports 62, 64, and/or at the first and second cradles 24 and 26. One or more additional amplifiers, repeaters, attenuators, variable attenuators, or filters may be included in the signal path to provide the desired signal gain at the splitter ports 62, 64 or the signal paths 68, 69 from the signal ports 62, 64. In one aspect, the first and second signal splitter ports 62 and 64 of the signal splitter 58 can be substantially equidistance from the server port 50 of the repeater 30. For example, the difference in distance the one or more RF signals travels between the server port 50 to each RF signal splitter ports 62, 64 can be within +/−10 millimeters.

However, it is not necessary for the first and second signal splitter ports 62 and 64 to be equidistant. There can be significantly different path lengths (and therefore different delay) of signals traveling in one of the splitter ports 62 and 64 relative to the other port 64 and 62. The signal splitter 58 can be configured such that a power of the one or more RF communication signals is substantially the same at the first and second signal splitter ports 62 and 64 of the signal splitter 58. For example, the power can be +/−0.5 dB between the first and second signal splitter ports 62 and 64. Ideally, each signal splitter 58 can provide a signal at a maximum power allowed by regulatory requirements at the location where the repeater system 10 is operating. However, different length cables may be attached to the different splitter ports, resulting in different power levels at the end of the cable. For example, one cradle 24 may be located may be mounted in an RV near the driver and another cradle 26 might be mounted in an RV near the dining area. The cradle 26 mounted in the dining area can be connected to a cable that is substantially longer than the cradle 24 mounted near the driver. Accordingly, the signal at the cradle 26 can have a lower power level than the signal at the cradle 24.

The first and second cradles 24 and 26, or the first and second antennas 18 and 20, are communicatively coupled to the first and second signal splitter ports 62 and 64, respectively, of the signal splitter 58. As illustrated in FIGS. 2*b* and 2*c*, the first and second cradles 24 and 26 have first and second interfaces 72 and 74, respectively, capable of selectively carrying first and second wireless user devices 78 and 80, respectively. As described above, the wireless user devices 78 and 80 can be cellular phones, hot spots, such as jetpacks or MiFi, laptop computers, tablet computers, etc.

The interfaces 72 and 74 can removably receive, hold and carry the wireless user devices 78 and 80. The interfaces 72 and 74 can be sized and shaped to hold and grip the wireless user devices 78 and 80. In one aspect, the interfaces 72 and 74 can comprise opposite fingers, sides or ends that are movable with respect to one another and biased towards one another to clamp the wireless user devices 78 and 80 there between. The first and second cradles 24 and 26 can also have first and second RF signal couplers, respectively, such as the first and second server antennas 18 and 20, to wirelessly couple the one or more RF communication signals to the first and second wireless user devices 78 and 80 when the user devices are carried by the cradles 24 and 26. The interfaces 72 and 74 can be capable of spacing the wireless user devices 78 and 80, respectively, with respect to the RF signal couplers or server antennas 18 and 20, and aligning, or positioning and orienting, the wireless user devices 78 and 80, and their RF antennas, with the RF signal couplers or server antennas 18 and 20. In one aspect, a back of the interfaces 72 and 74 can abut to the wireless user devices 78 and 82, respectively, to space the wireless user devices 78 and 80 with respect to the RF signal couplers or the server antennas 18 and 20. In another aspect, fingers, sides or ends can align, or position and orient, the wireless user devices 78 and 80 with respect to the RF signal couples or server antennas 18 and 20. Alternatively, the cradles can have a substantially flat surface or indented surface. The cradle with the substantially flat surface can be configured to hold one or more wireless user devices on the cradle. In one example, a magnet can be used to mount a wireless user device to the flat surface and/or position each wireless user device in a specific location on the cradle. In one example, the cradle can include multiple server antennas 18 and 20 to allow multiple wireless user devices 78 and 80 to be coupled to the cradle via a server antenna.

As described above, in one aspect, the maximum gain of the one or more RF signals at the cradles 24 and 26 and/or at the first and second server antennas 18 and 20 and/or at the first and second RF signal splitter ports 62 and 64 can be 23 dB, relative to the one or more RF signals at the donor port. In addition, in one aspect, a maximum range of the cradles 24 and 26 and/or the first and second server antennas 18 and 20 or the first and second RF signal couples can be 8 inches or 20 cm.

In one aspect, the first and second cradles 24 and 26 can be separate and discrete cradles with respect to one another. Thus, the cradles 24 and 26 can be separately and independently located, and can be positioned with respect to one another with variable distances. For example, the first cradle 24 can be affixed to a dashboard or console adjacent a driver's seat in a vehicle, while the second cradle 26 can be disposed on the dashboard or console adjacent a passenger's seat in the vehicle. Because different vehicles have different sized dashboards or consoles, the separate cradles 24 and 26 allow relative positioning to accommodate the different sized dashboards or consoles. The cradles 24 and 26 can be coupled to the repeater 30 and/or the signal splitter 58 by co-axial cables 68 or 69. The first and second cradles 24 and 26 can be equidistance from the server port 50 of the repeater 58, or the coaxial cables 68 or 69 thereof can be the same length. Thus, the power of the one or more RF communication signals is substantially the same at the first and second cradles 24 and 26, or first and second server antennas 18 and 20 thereof. In addition, the cradles 24 and 26 can be separate and discrete from the repeater 30 and/or the signal splitter. The repeater 30 and/or the signal splitter 58 can be located in the vehicle separately and independently from the cradles 24 and 26, such as in a glove box, a trunk, or behind the dashboard, of the vehicle. The repeater 30 can be coupled to a power source of the vehicle, such as the battery or alternator. As described above, in one aspect, the first and second wireless user devices 78 and 80 can be cellular phones. In another aspect, the first wireless user device 78 can be a cellular phone, while the second wireless user device 80 can be a wireless hotspot.

As described above, the repeater system 10 or signal booster can comprise the server antennas 18 and 20, and the donor antenna 14. The donor antenna 14 can receive a downlink signal from a base station. The downlink signal can be provided to a signal amplifier, such as the BDA 34, via a coaxial cable 46 or other type of radio frequency connection operable to communicate radio frequency signals. The signal amplifier or BDA 34 can include one or more cellular signal amplifiers, bandpass filters, and variable attenuators for amplification and filtering of the downlink signals. The downlink signal that has been amplified and filtered can be provided from the repeater 30 to the server antennas 18 and 20 via coaxial cables 68 or 69 or other type of radio frequency connection operable to communicate radio frequency signals, via the signal splitter 58. The server antennas 18 and 20 can wirelessly communicate the downlink signal that has been amplified and filtered to the wireless user devices 78 and 80.

Similarly, the server antennas 18 and 20 can receive uplink signals from the wireless user devices 78 and 80. The uplink signals can be provided to the signal amplifier or BDA 34 via the coaxial cables 68 or 69 or other type of radio frequency connection operable to communicate radio frequency signals, and the signal splitter 58. The signal amplifier or BDA 34 can include one or more cellular signal amplifiers, bandpass filters, and variable attenuators for amplification and filtering of the uplink signals. The uplink signal that has been amplified and filtered can be provided from the donor port 42 of the repeater 30 to the donor antenna 14 via the coaxial cable 46 or other type of radio frequency connection operable to communicate radio frequency signals. The donor antenna 14 can communicate the uplink signal that has been amplified and filtered to a node, such as a base station.

In one example, the repeater system 10 can send uplink signals to a node and/or receive downlink signals from the node, such as a base station, which is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 30 or signal booster can be a Federal Communications Commission (FCC)-compatible consumer signal booster. As a non-limiting example, the repeater 30 or signal booster can be compatible with FCC Part 20 or 47 Code of Federal Regulations (C.F.R.) Part 20.21 (Mar. 21, 2013). In addition, the repeater 30 or signal booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R.

The repeater 30 or signal booster can be configured to automatically self-monitor its operation to ensure compliance with applicable noise and gain limits. The repeater 30 or signal booster can either self-correct or shut down automatically if the signal booster's operations violate the regulations defined in 47 CFR Part 20.21.

In one configuration, the repeater 30 or signal booster can improve the wireless connection between the wireless user devices 78 and 80 and the base station (e.g., cell tower) or another type of wireless wide area network (WWAN) access point (AP). The repeater 30 can boost signals from the Third Generation Partnership Project (3GPP) Technical Specification (TS) 36.101 (Release 16 January 2019) bands or LTE frequency bands. For example, the repeater 30 can boost signals from the LTE frequency bands: 2, 4, 5, 12, 13, 17, 25, and 26. In addition, the repeater 30 can boost selected frequency bands based on the country or region in which the repeater is used, including any of bands 1-85 or other bands, as disclosed in 3GPP TS 36.104 V16.0.0 (January 2019).

In another configuration, the repeater 30 can boost signals from the 3GPP Technical Specification (TS) 38.104 (Release 15 Jan. 2019) bands or 5G frequency bands. In addition, the repeater 220 can boost selected frequency bands based on the country or region in which the repeater is used, including any of bands n1-n86, n257-n261, or other bands, as disclosed in 3GPP TS 38.104 V15.4.0 (January 2019).

The number of LTE frequency bands and the level of signal improvement can vary based on a particular wireless user device, cellular node, or location. Additional domestic and international frequencies can also be included to offer increased functionality. Selected models of the repeater 30 or signal booster can be configured to operate with selected frequency bands based on the location of use. In another example, the repeater 30 or signal booster can automatically sense from the wireless user devices 78 and 80 or base station (or GPS, etc.) which frequencies are used, which can be a benefit for international travelers.

In one aspect, the signal splitter 58 can be separate from the repeater 30, and communicatively coupled to the repeater 30, such as by a co-axial cable 54. The signal splitter 58 can have another port 60 coupled to the repeater 30 or the server port 50 by the co-axial cable 54.

FIG. 2d depicts another example of a repeater system 10b in an example of the invention which is similar in many respects to that described above, and which description is hereby incorporated herein by reference. The repeater 30b has the signal splitter 58b integrated into the repeater 30b, or the housing 38 and electrical components thereof, and providing first and second server ports 62 and 64 at the server 30b. In one aspect, the first and second server ports 62 and 64 can be co-axial couplers carried by the housing 38 of the repeater 30b, and configured to be coupled to co-axial cables 68 and 69 associated with the cradles 24 and 26. In one aspect, the signal splitter 58 can be disposed in the housing 38 along with the electrical components of the repeater 30, such as the BDA 34. Thus, the signal splitter 58 and the repeater 30 can share the housing 38, and the housing 38 can be a single shared housing. In another aspect, the signal splitter 58 can be located with the other electrical components of the repeater 30 on one or more PCBs disposed in the housing 38. Integrating the signal splitter 58 with the wireless repeater 30 reduces the number of components and cabling.

In addition, certain regulatory requirements, such as FCC requirements, are established with respect to an input of the repeater 30b relative to an output of the repeater 30b. For example, the gain may be measured relative to an input of the one or more RF signals at the donor port 42 relative to the first and second server ports 62 and 64. The level of gain at the first and second server ports 62 and 64 can be based on the type of component connected to the first and second server ports 62 and 64. For example, the gain at port 62 or 64 can be set to 23 dB for a cradle, such as cradle 24 or 26. The gain at port 62 or 64 can be set to 50 dB for an antenna in a mobile vehicle. The gain at port 62 or 64 can be set to 65-72 dB for a stationary antenna in a building or RV. This will be discussed more fully in the proceeding paragraphs.

While the examples illustrate a splitter 58 with two splitter ports 62 and 64, this is not intended to be limiting. The splitter 58 can include up to n ports, where n is a positive integer greater than or equal to 2. This enables n different signals to be communicated between the splitter and n server antenna ports or n server antennas. Each server port can be configured to be connected to a server antenna, a cradle having a server antenna, or a direct connect device. A direct connect device is an electronic device such as a modem or other type of user equipment that is directly connected to the repeater system via a wired connection.

FIGS. 3a and 3b depict another example of a repeater system 10c in an example of the invention which is similar in many respects to those described above, and which descriptions are hereby incorporated herein by reference. The first cradle 24c can be a primary or master cradle and the second cradle 26 can be a secondary or slave cradle. Each cradle 24c, 26 can be configured to carry a wireless user device or be configured as a wireless hot spot. The repeater 30 and/or the splitter 58 can be disposed in and carried by the first cradle 24c, or the primary or master cradle, while the second cradle 26, or the secondary or slave cradle, can be coupled to the primary or master cradle. The second signal splitter port 64 or second server port can be a co-axial coupler carried by the first cradle 24c, or housing thereof, and coupled to a co-axial cable 69 associated with the second cradle 26. Because of the distance between the first and second cradles 24c and 26, or because of the relatively larger distance of the second server antenna 20 from the signal splitter 58 and the relatively shorter distance of the first server antenna 18 from the signal splitter 58, the signal splitter 58 can be or can comprise an uneven signal splitter, or can be or can comprise a tap or a directional coupler. Again, the signal splitter 58, or the tap or directional coupler, can be configured to provide a maximum gain of 23 dB at the first and second cradles 24c and 26 relative to the signal at the donor port. In one example, the first cradle 24c and/or second cradle 26 can be a direct connect device, with a signal having a maximum gain of 15 dB at the ports 62 or 64 of the splitter 58 that is provided to the direct connect device. One or more variable attenuators can be used to adjust a maximum gain at each cradle or direct connect device. Alternatively, the maximum gain may be measured at a port, such as an output port of the splitter 58 or an input port of each cradle, as previously discussed. The maximum gain can be set at each selected location to meet regulatory requirements.

Figure 4A:
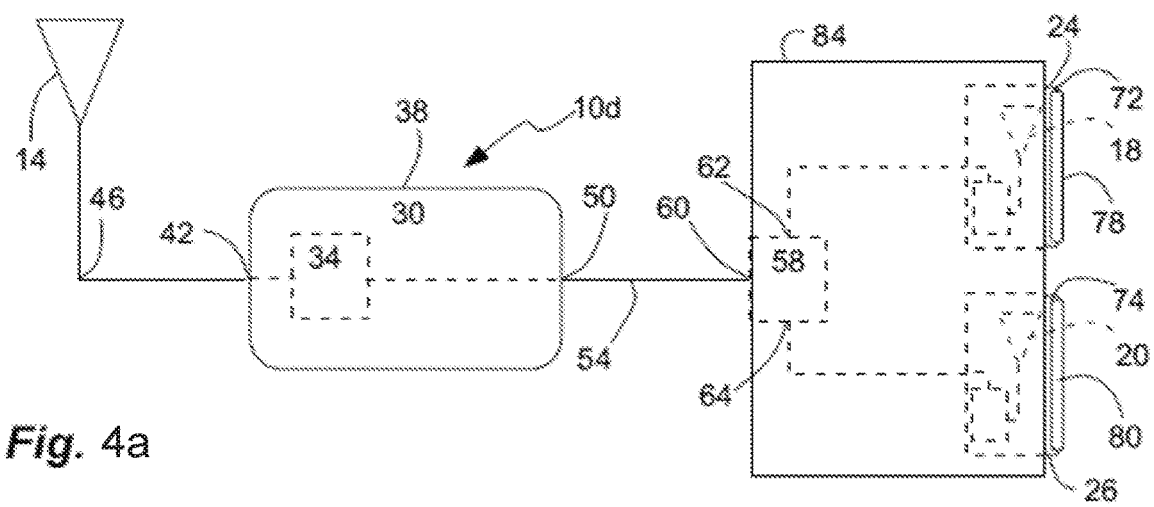
FIG. 4a is a schematic view of another repeater system in accordance with another example.
Figure 4B:
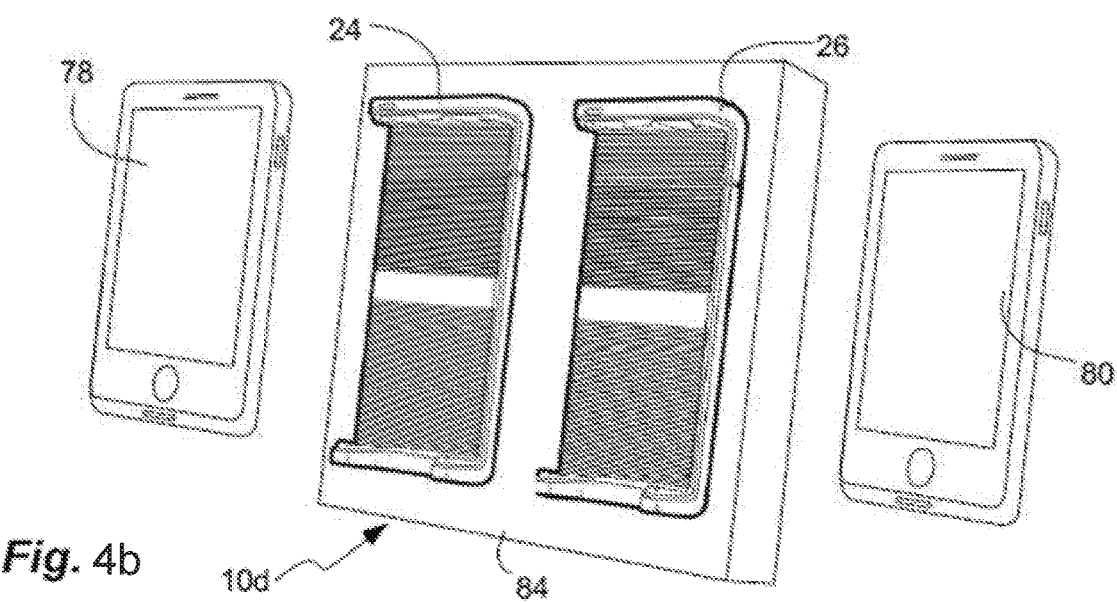
FIG. 4b is a perspective view of cradles of the repeater system of FIG. 4a, with first and second wireless user devices, namely cellular phones, removed from the cradles.

FIGS. 4a and 4b depict another example of a repeater system 10d in an example of the invention which is similar in many respects to those described above, and which descriptions are hereby incorporated herein by reference. The repeater system 10d has a single cradle housing 84 comprising the first and second cradles 24 and 26, the first and second interfaces 72 and 74, and the signal splitter 58. The first and second cradles have a single, shared cradle housing 84. Thus, the cradles 24 and 26 or the interfaces 72 and 74 can be commonly located. For example, the cradle housing 84, or the first and second cradles 24 and 26 and the first and second interfaces 72 and 74, can be affixed to the dashboard or console in the vehicle between the driver's seat and the passenger's seat for ease of access by both the driver and the passenger. In addition, the first and second cradles 24 and 26, or the first and second server antennas 18 and 20 thereof, can be equidistance from the server port 50 of the repeater 30. Thus, the power of the one or more RF communication signals can be substantially the same at the first and second cradles 24 and 26, or the first and second server antennas 18 and 20 thereof. However, this is not necessary. As previously discussed, different length cables can be used that can result in unequal power delivered to the cradles 24 and 26.

Figure 4C:
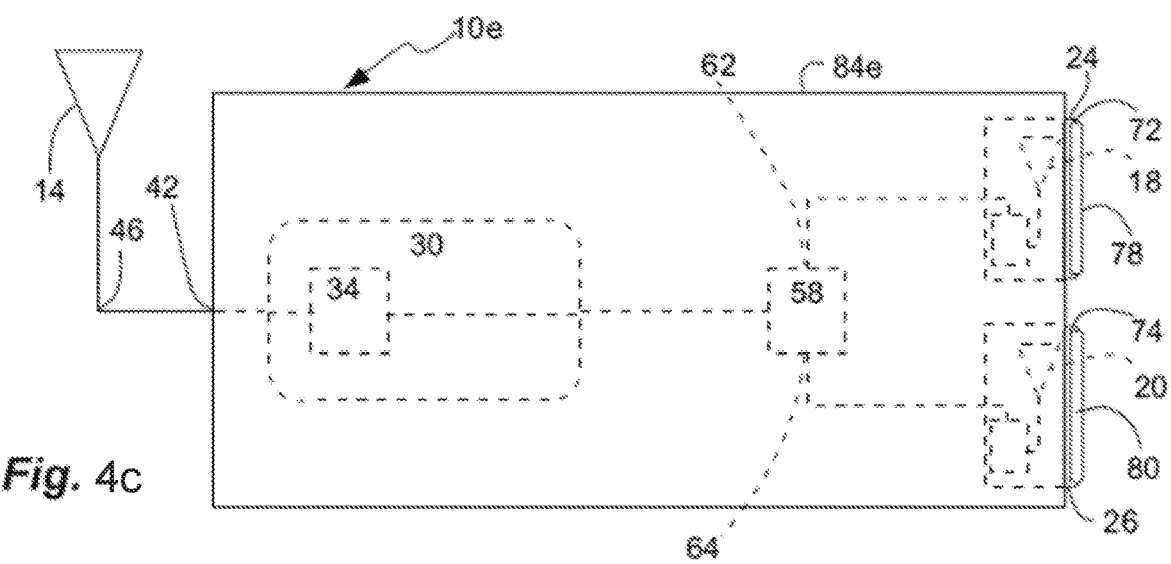
FIG. 4c is a schematic view of another repeater system in accordance with another example.

FIG. 4c depicts another example of a repeater system 10e in an example of the invention which is similar in many respects to those described above, and which descriptions are hereby incorporated herein by reference. The repeater system 10e has a single, shared housing 84e comprising the first and second cradles 24 and 26, the first and second interfaces 72 and 74, the repeater 30, and/or the signal splitter 58. The housing 84e, and thus the cradles 24 and 26 or the interfaces 72 and 74, and the repeater 30, can be commonly located. In addition, the signal splitter 58 can be integrated with the repeater 30, as described above. As in FIGS. 3a-3b, one or more of the cradles 24 and 26 illustrated in FIGS. 4a-4c can also be direct connect devices.

Figure 4D:
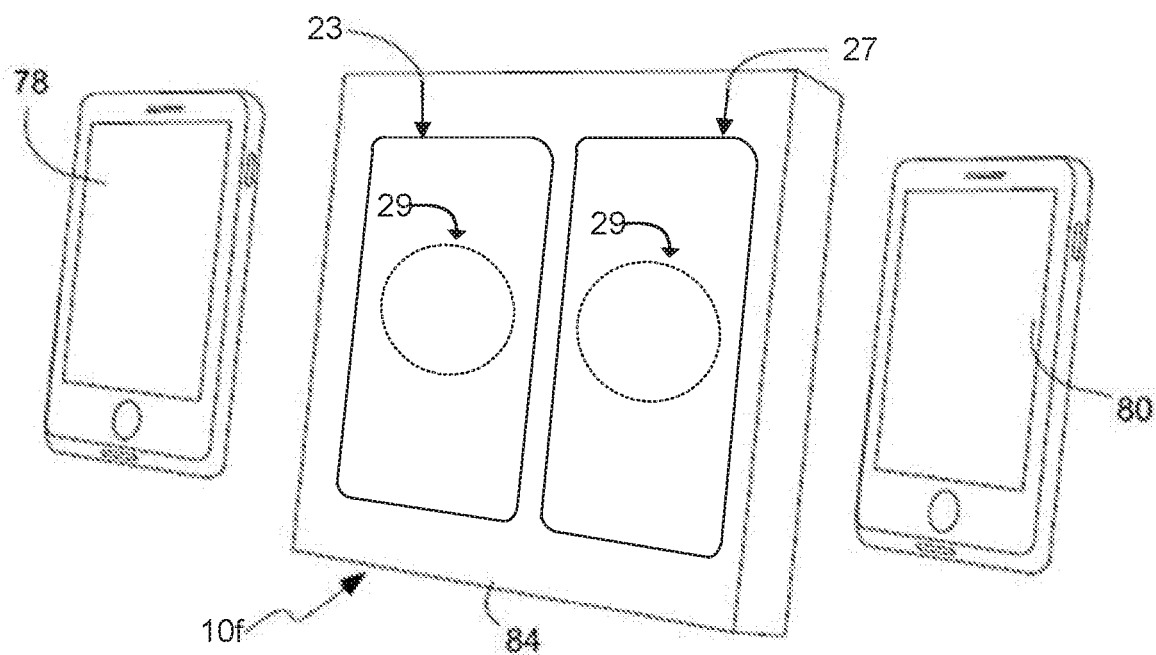
FIG. 4d is a schematic view of another repeater system in accordance with another example.

FIG. 4d depicts another example of a repeater system 10f in a single cradle housing 84. In this example, instead of using the cradles 24 and 26, the cradle housing 84 can use other means for retaining the user devices 78 and 80. For example, user device retention areas 23 and 27 are configured to retain the user devices 78 and 80, respectively. The user device retention areas 23 and 27 can be substantially flat or concave. A surface adhesion material may be applied, such as a plastic, silicon, or rubber material to allow the user devices 78 and 80 to adhere to the retention areas 23 and 27. In one example a magnetic retention device 29 can be located behind a front surface of the single cradle housing 84. The magnetic retention device 29 can be a single magnet, or a material that includes two or more separate magnets. The magnets can adhere directly to the user devices 78 and 80 to retain the user devices. Alternatively, a second magnetic retention device can be configured to be applied to each user device 78, 80. The second magnetic retention device can be applied using an adhesive, or can be applied to another material, such as a case configured to retain a user device. The second magnetic retention device can magnetically mate with the magnetic retention device 29 to align each user device 78, 80 with a server antenna, such as the RF coupling antennas 18 and 20 illustrated in FIGS. 4a and 4c. Signals can be communicated between the repeater 30 and the coupling antennas 18 and 20 via the splitter 58, as previously discussed.

Figure 5A:
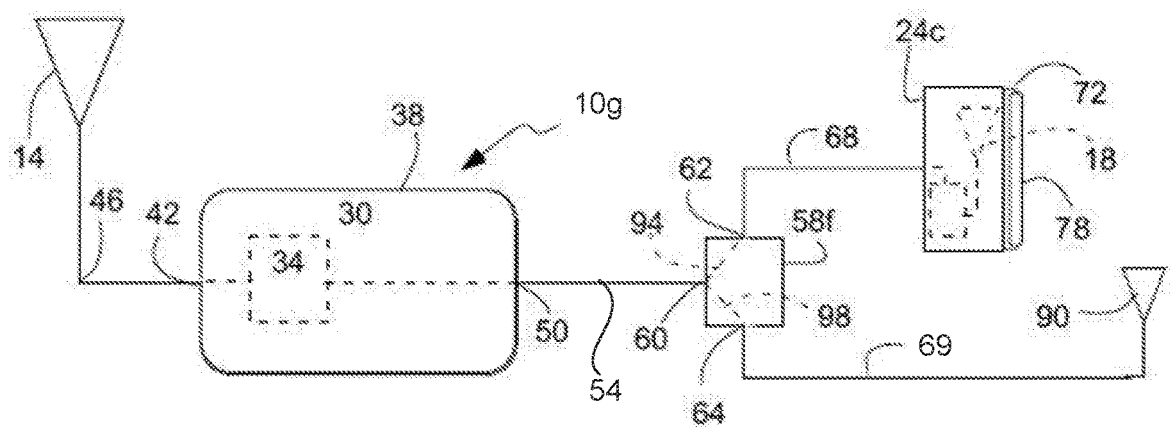
FIG. 5a is a schematic view of another repeater system in accordance with another example.

FIG. 5a depicts another example of a repeater system 10g in an example of the invention which is similar in many respects to those described above, and which descriptions are hereby incorporated herein by reference. The repeater system 10g can boost the one or more RF communication signals for both a cradle 24c and a server antenna 90. The server antenna 90 can have a greater power and a greater range than the cradle 24c. For example, a user can dispose a wireless user device 78 in the cradle 24c, while still providing a signal for others in the vehicle. The server antenna 90 can be coupled to the second signal splitter port 64 via a cable, such as coaxial cable 69. The cable 69 can have a different length than the cable 68 used to connect port 62 to the cradle 24c. In addition, the repeater system 10g can comprise a signal tap 58f. The signal tap 58f can split the one or more RF communication signals disproportionally between a coupled signal path 94 to the first signal splitter port 62, and a second signal path 98 to the second signal splitter port 64. The second signal path 98 can be a low-loss signal path. The signal tap 58*f* can provide a majority of the power of the one or more RF communication signals along the second signal path 98 while a smaller amount of the power of the one or more RF communication signals can be tapped off by the signal tap along the coupled path 94. The power of the one or more RF communication signals at the second signal splitter port 64 can be greater than the power of the one or more RF communication signals at the first signal splitter port 62. Thus, the server antenna 90 can be coupled to the second signal path 98. Again, the signal tap 58*f*, and the repeater 30, can be configured to provide a signal with a maximum gain of 23 dB at the first signal splitter port 62 or at the first cradle 24*c*. relative to the signal at the donor port. In addition, the signal tap 58*f*, and the repeater 30, can provide a signal with a greater maximum gain at the second signal splitter port 64 or the server antenna 90, such as 50 dB or 65-72 dB, or another desired power level based on the application and regulatory requirements. The server antenna 90 can be located a greater distance from the repeater 30 than the cradle 24. In one aspect, the server antenna 90 can be an internal server antenna 90 and can be located inside an RV, and used when the RV is stationary. In another aspect, a variable attenuator can be included that can enable the output of the second signal splitter port 64 to be variable. For example, when an RV is moving, the repeater can be configured to provide a signal at the second signal splitter port 64 with a maximum gain of 50 dB relative to the signal at the donor port. When the RV is stationary, the repeater can provide a signal at the second signal splitter port with a maximum gain of 65 to 72 dB relative to the signal at the donor port, or another gain level based on a regulatory requirement where the repeater system 10*g* is located. In one aspect, the signal tap 58*f* can be separate from the repeater 30, and communicatively coupled to the repeater 30, such as by a co-axial cable 54, as shown. In one aspect, the cradle 24*c* can be a direct connect device configured to receive a signal with a gain of 15 dB. The gain can be measured at the port 62 or at the direct connect device. The location where the gain is measured can depend on the regulatory group governing the use of the repeater system 10*g*.

In one example, a repeater system can comprise a repeater 30 having a server port 50 and a donor port 42 that is configured to be coupled to a donor antenna 14. The repeater 30 can include a first direction amplification and filtering path 108 coupled between the donor port and the server port; and a second direction amplification and filtering path 110 coupled between the donor port and the server port, as illustrated in FIG. 1*a*. The repeater system can further comprise a signal splitter 58 communicatively coupled to the server port 50 and having at least first 62 and second 64 signal splitter ports. The signal splitter may be located internal to, or external from a housing 38 of the repeater 30.

A first signal splitter path 68 can be coupled to the first signal splitter port 62. A second signal splitter path 69 can be coupled to the second signal splitter port 64. The repeater system can be configured to receive one or more RF communications signals at the donor port 42, from the donor antenna 14. A selected amount of gain can be applied to the one or more RF communications signals at each of the signal splitter paths 68, 69. The amount of gain applied to signals at each signal splitter path can be determined, or predetermined, based on the server antenna device that is connected, or configured to be connected, to each signal splitter path. The amount of gain applied can be selected using a signal tap 58*f*. Additional amplifiers, attenuators, variable attenuators, or repeaters can also be used to reduce or increase gain at each signal splitter path to provide a desired amount of gain to a server antenna device communicatively coupled to a signal splitter port 62, 64 via a signal splitter path 68, 69.

As previously discussed, regulatory groups, such as the FCC in the United States, limits the amount of gain a cellular signal booster can apply to a downlink signal. The amount of gain is determined based on the type of antenna or device in communication with a server antenna. The antenna or device can be referred to as a server antenna device. Server antenna devices can be categorized into groups, or classes, based on the amount of gain that can be applied for signals sent to devices in the group.

In one example, server antenna devices in a first server antenna device class are devices that are configured to receive the one or more RF communication signals with a signal gain of 15 decibels (dB) at a signal splitter path (i.e. 68 or 69) relative to the one or more RF communication signals at the donor port 42. This group can include direct connect devices.

A second server antenna device class is for server antenna devices that are configured to receive the one or more RF communication signals with a signal gain of 23 dB at the signal splitter path relative to the one or more RF communication signals at the donor port. Examples of devices in this group are devices, such as cradles, that have RF coupling antennas that are configured to couple to an antenna in a wireless user device.

A third server antenna device class is for server antenna devices that are configured to receive the one or more RF communication signals with a signal gain of 50 dB at the signal splitter path (68 or 69) relative to the one or more RF communication signals at the donor port. Examples of devices in this group are mobile server antennas configured for land or marine vehicles (i.e. boats).

A fourth server antenna device class is for server antenna devices that are configured to receive the one or more RF communication signals with a signal gain of 65 to 72 dB at the signal splitter path relative to the one or more RF communication signals at the donor port. Examples of devices in this group are stationary server antennas. The stationary server antennas can be located in buildings or stationary mobile vehicles such as trailers or mobile homes.

In one example, the first signal splitter path 68 is configured to be coupled to a first server antenna device in a server antenna device class that is operable to receive the one or more RF communication signals with a first gain. A second signal splitter path 69 is coupled to the second signal splitter port 64. The second signal splitter path is configured to be coupled to a second server antenna device (i.e. 24 or 90) in a server antenna device class operable to receive the one or more RF communication signals with a second gain level different from the first gain level. While two signal splitter paths are illustrated, this is not intended to be limiting. The splitter 58 can be an n-way splitter (or additional splitters can be used to create an n-way splitter), where n is a positive integer. Each signal splitter port can include a signal splitter path that is configured to be coupled to a server antenna device in a server antenna device class operable to receive the one or more RF communication signals with a selected gain level. The selected gain level is dependent on the server antenna device class in which the server antenna device is located.

Figure 5B:
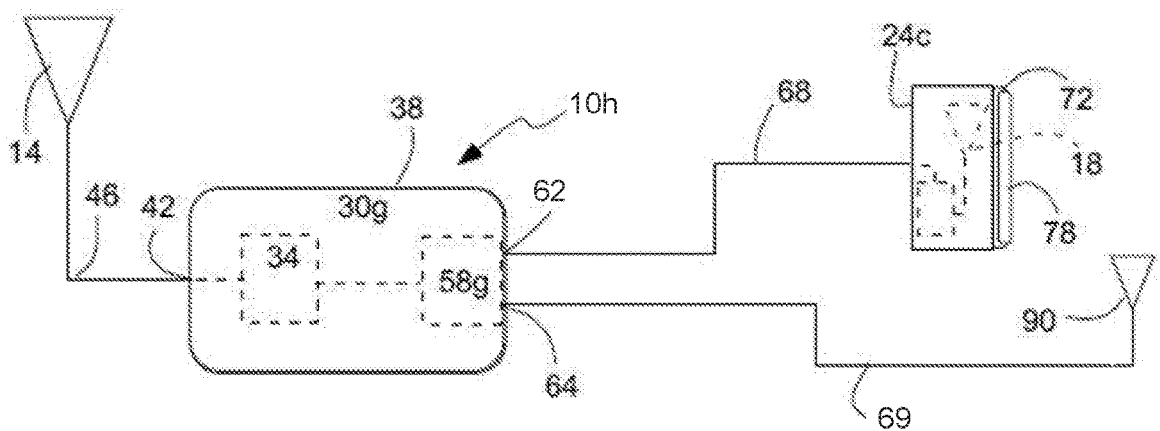
FIG. 5b is a schematic view of another repeater system in accordance with another example.

FIG. 5*b* depicts another example of a repeater system 10*h* in an example of the invention which is similar in many respects to those described above, and which descriptions are hereby incorporated herein by reference. The repeater 30*g* has the signal tap 58*g* integrated into the repeater 30*g*, or the housing 38 and electrical components thereof, and providing first and second server ports 62 and 64. In one aspect, the signal tap 58*g* can be disposed in the housing 38 along with the electrical components of the repeater 30*g*, such as the BDA 34. Thus, the signal tap 58*g* and the repeater 30*g* can share the housing 38, and the housing 38 can be a single shared housing. In another aspect, the signal tap 58*g* can be located with the other electrical components of the repeater 30*g* on one or more PCBs disposed in the housing 38. In one aspect, the gain can be measured at each server port 62 and 64 relative to the input signal at port 42.

Figure 6A:
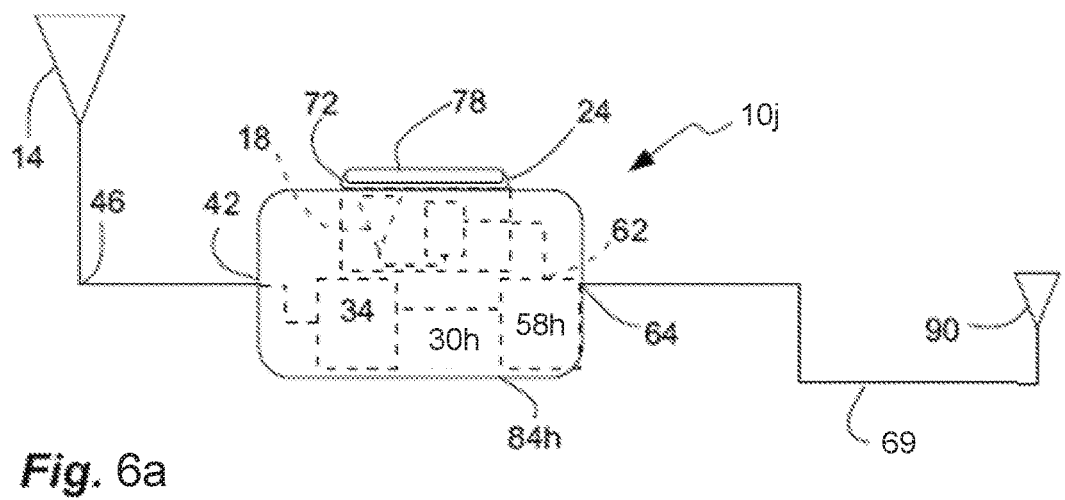
FIG. 6a is a schematic view of another repeater system in accordance with another example.
Figure 6B:
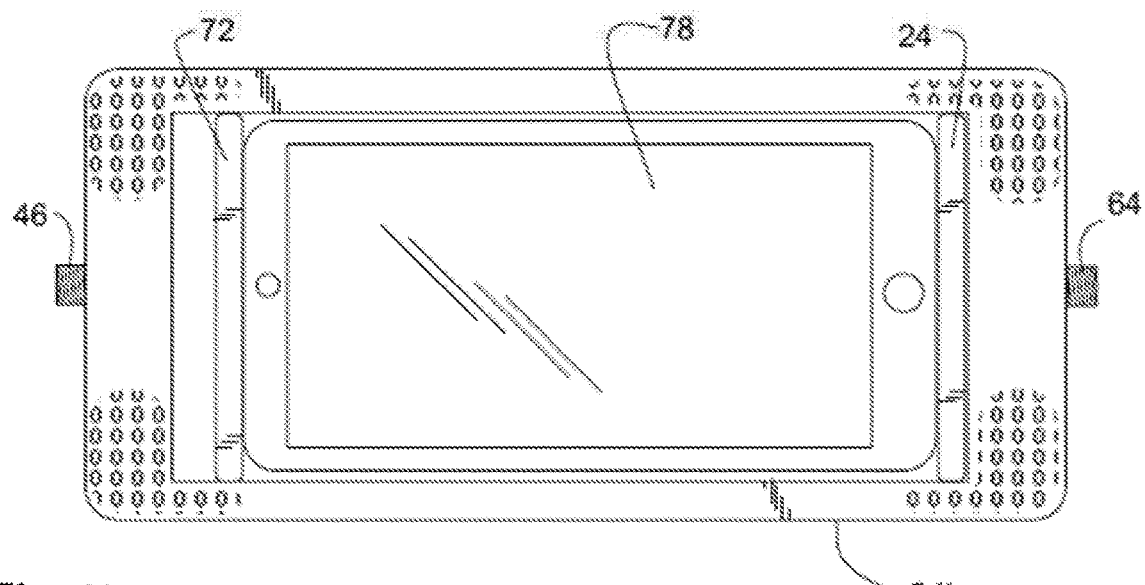
Figure 6C:
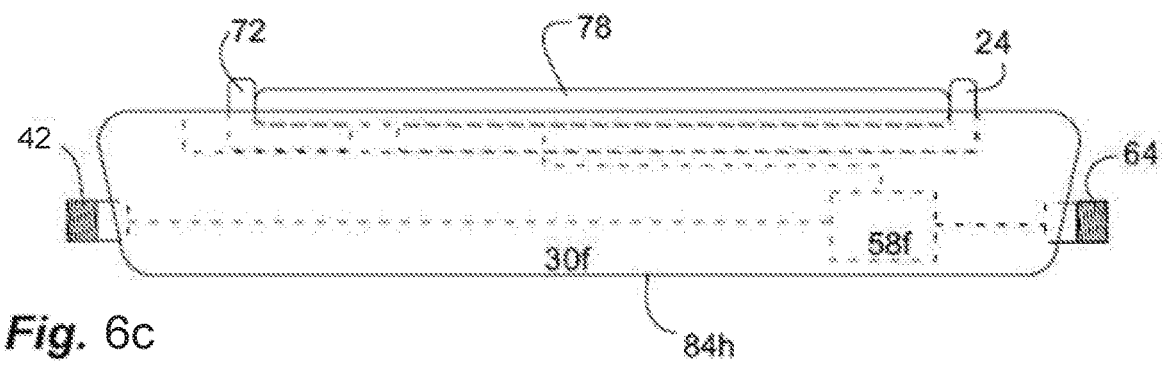

FIGS. 6*a*-*c* depict another example of a repeater system 10*j* in an example of the invention which is similar in many respects to those described above, and which descriptions are hereby incorporated herein by reference. The repeater system 10*j* has a single, shared housing 84*h* comprising the cradle 24, the first interface 72, the repeater 30*h*, and the signal tap 58*h*. The housing 84*h* can form the cradle 24 and the interface 72, or the cradle 24 and the interface 72 can be integrated into a lid of the housing 84*h*. The donor port 42 can be a co-axial coupler carried by the housing 84*h* and coupled to a co-axial cable 46 associated with the donor antenna 14. The server antenna 18 or the RF signal coupler of the cradle 24 is disposed in the housing 84*h* and located adjacent to the interface 72. In addition, the server antenna 18 or the RF signal coupler of the cradle 24 is coupled to the first signal splitter port 62 of the signal tap 58*h*. The second signal splitter port 64 or second server port can be a co-axial coupler carried by the housing 84*h* and configured to be coupled to a co-axial cable 69 associated with the server antenna 90. The repeater 30*h* can be configured to provide a full 65-72 dB gain to the second signal splitter port 64 and/or the server antenna 90. The signal tap 58*h* can be a 30 dB tap to provide 23 dB to the cradle 24 or a port to the cradle 24. In one aspect, the wireless user device 78 can be a wireless hotspot such as a Jetpack, MiFi, or a cellular phone. In one example, signal tap 58*h* can provide 15 dB to a direct connect device. Thus, the repeater system 10*j* and/or the repeater 30*h* can provide a signal boost to the wireless user device 78 and signal coverage to a larger area, such as an RV, through the server antenna 90. As previously discussed, the output of the second signal splitter port 64 can be variable to allow the gain of the signal to vary to provide a signal with the maximum power based on the use case, such as movement of a vehicle or the stationary positioning of a vehicle such as an RV.

Figure 7A:
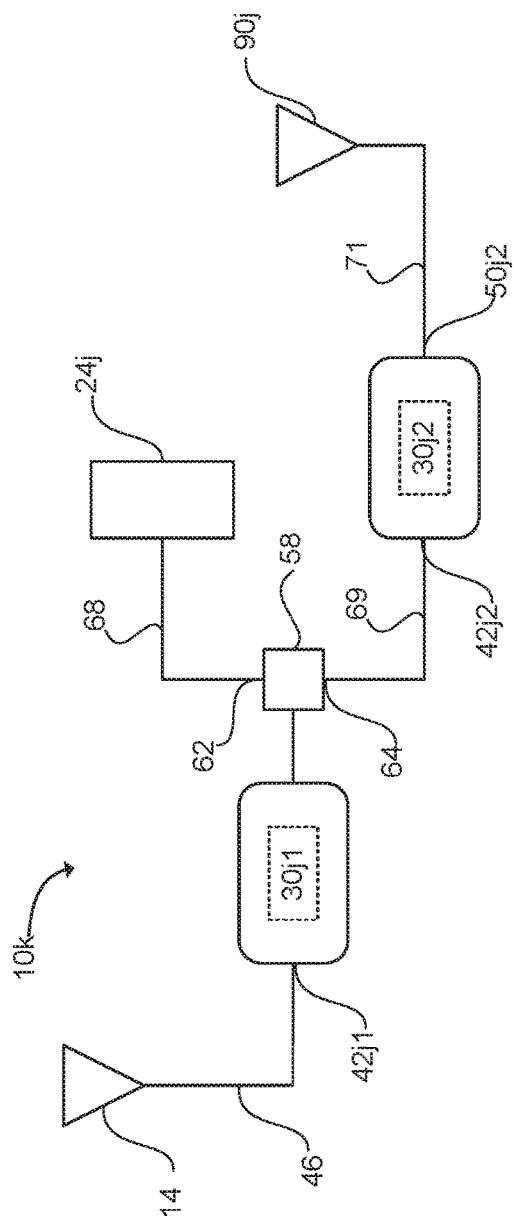
FIG. 7a is a schematic view of another repeater system in accordance with another example.

FIG. 7*a* depicts another example of a repeater system 10*k* in an example of the invention which is similar in many respects to those described above, and which descriptions are hereby incorporated herein by reference. The repeater system 10*k* illustrates the use of two separate repeaters 30*j*1 and 30*j*2 to provide a desired level of gain at a cradle 24*j* and a server antenna 90*j*, respectively. Each repeater can be configured as illustrated in the examples of FIGS. 1*a*-1*c*. In the example of FIG. 7*a*, a first repeater 30*j*1 can provide 23 to 26 dB of gain of a downlink signal at a first signal splitter port 62 and 23 to 26 dB of gain at a second signal splitter port 64. The gain at each signal port is relative to the one or more RF signals at the input port 42*j*1 of the first repeater 30*j*1. The first signal splitter port 62 can be configured to provide the one or more RF signals with the gain of 23 to 26 dB to the cradle 24*j* via coaxial cable 68. The output of the second signal splitter port 64 can be coupled to an input port of a second repeater 30*j*2 via coaxial cable 69. The second repeater 30*j*2 can provide additional gain to the one or more RF signals directed to the server antenna 90*j*. For example, an additional 27 dB of gain can be provided for the one or more RF signals output from port 64 relative to the input port 42*j*2 of the second repeater 30*j*2, for a total gain of approximately 50 dB relative to the input port 42*j*1 of the first repeater 30*j*1. An additional cable, such as coaxial cable 71, can route signals between the server antenna 90*j* and port 50*j*2 of the second repeater. In one example, measured or expected loss in the cables 69 and 71 can be compensated for by the gain provided by the second repeater 30*j*2. This can allow a signal with a maximum gain allowed by the regulatory group to be provided to the server antenna 90*j*.

In one example, the additional 27 dB of gain can be provided by the second repeater 30*j*2 when the server antenna 90*j* is located in a moving vehicle. Additional gain can be provided when the server antenna is located in a stationary vehicle, such as an RV or inside of a building. For example, an additional gain of 42 to 49 dB of gain can be provided at the output port 50*j*2 of the second repeater 30*j*2 when the server antenna is in the stationary vehicle or building, for a total of 65 to 72 dB of gain relative to the input port 42*j*1 of the first repeater 30*j*1.

Figure 7B:
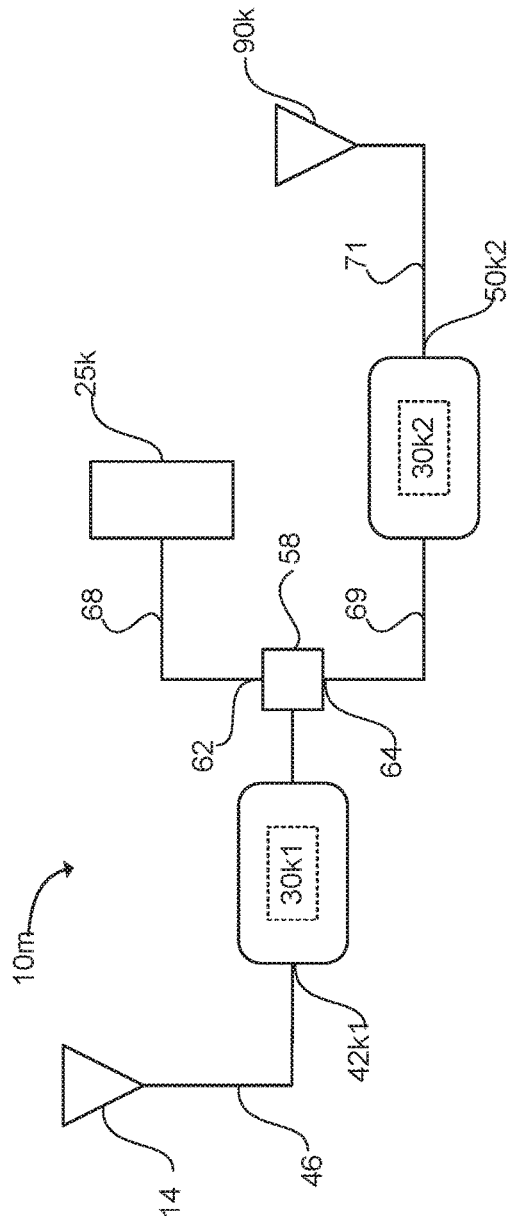
FIG. 7b is a schematic view of another repeater system in accordance with another example.

FIG. 7*b* depicts another example of a repeater system 10*m* in an example of the invention which is similar in many respects to those described above, and which descriptions are hereby incorporated herein by reference. The repeater system 10*m* illustrates the use of two separate repeaters 30*k*1 and 30*k*2 to provide a desired level of gain at a direct connection 25*k* and a server antenna 90*k*, respectively. In the example of FIG. 7*b*, a first repeater 30*k*1 can provide 15 to 18 dB of gain at a first signal splitter port 62 and a second signal splitter port 64. The first signal splitter port 62 can be configured to provide the one or more RF signals with the gain of 15 to 18 dB to the direct connection, such as a direct connect modem via coaxial cable 68. The output of the second signal splitter port 64 can be coupled to an input port of a second repeater 30*k*2 via coaxial cable 69. The second repeater 30*k*2 can provide additional gain to the server antenna 90*k*, as previously discussed. In this example, the second repeater can provide an additional 35 dB of gain to the output of the one or more RF signals from the second signal splitter port 64. The additional 35 dB of gain can provide for a total of approximately 50 dB of gain at an output 50*k*2 of the second repeater 30*k*2 relative to the input port 42*k*1 of the first repeater 30*k*1. The 50 dB of gain can be provided when the server antenna 90*k* is located in a moving vehicle. Additional gain can be provided when the server antenna 90*k* is located in a stationary vehicle, such as an RV or inside of a building. For example, an additional gain of 50 to 57 dB of gain can be provided at the output port 50*k*2 of the second repeater 30*k*2 when the server antenna 90*k* is in the stationary vehicle or a building. An additional cable, such as coaxial cable 71, can route signals between the server antenna 90*j* and port 50*j*2 of the second repeater. In one example, measured or expected loss in the cables 69 and 71 can be compensated for by the gain provided by the second repeater 30*j*2. This can allow a signal with a maximum gain allowed by the regulatory group to be provided to the server antenna 90*j*.

The examples of FIGS. 7*a* and 7*b* are not intended to be limiting. The external splitter 58 can be located internal to the first repeater 30*j*1 and 30*k*1, as previously discussed with respect to FIG. 2*d*.

In one aspect, the cradles described above can also include one or more controllers. The one or more controllers can include an RF signal coupler controller circuit configured to tune the one or more RF signal couplers based one or more signal bands of the one or more RF communication signals. The RF signal coupler controller circuit can also, alternatively or in addition, be configured to tune the one or more RF signal couplers based on operation of the one or more power couplers. In one implementation, a controller can select a given capacitance load from a switch capacitance bank to tune one or more RF signal couplers.

In one implementation, the one or more controllers can automatically select one of a plurality of RF couplers from a plurality of RF couplers based on a signal strength of the RF communication signals received at each RF coupler, and/or based on a mutual coupling between the RF couplers and the power couplers. In another implementation, one or more switches may enable a user to manually select one or more RF couplers from a plurality of couplers based upon a particular wireless user device.

Figure 8:
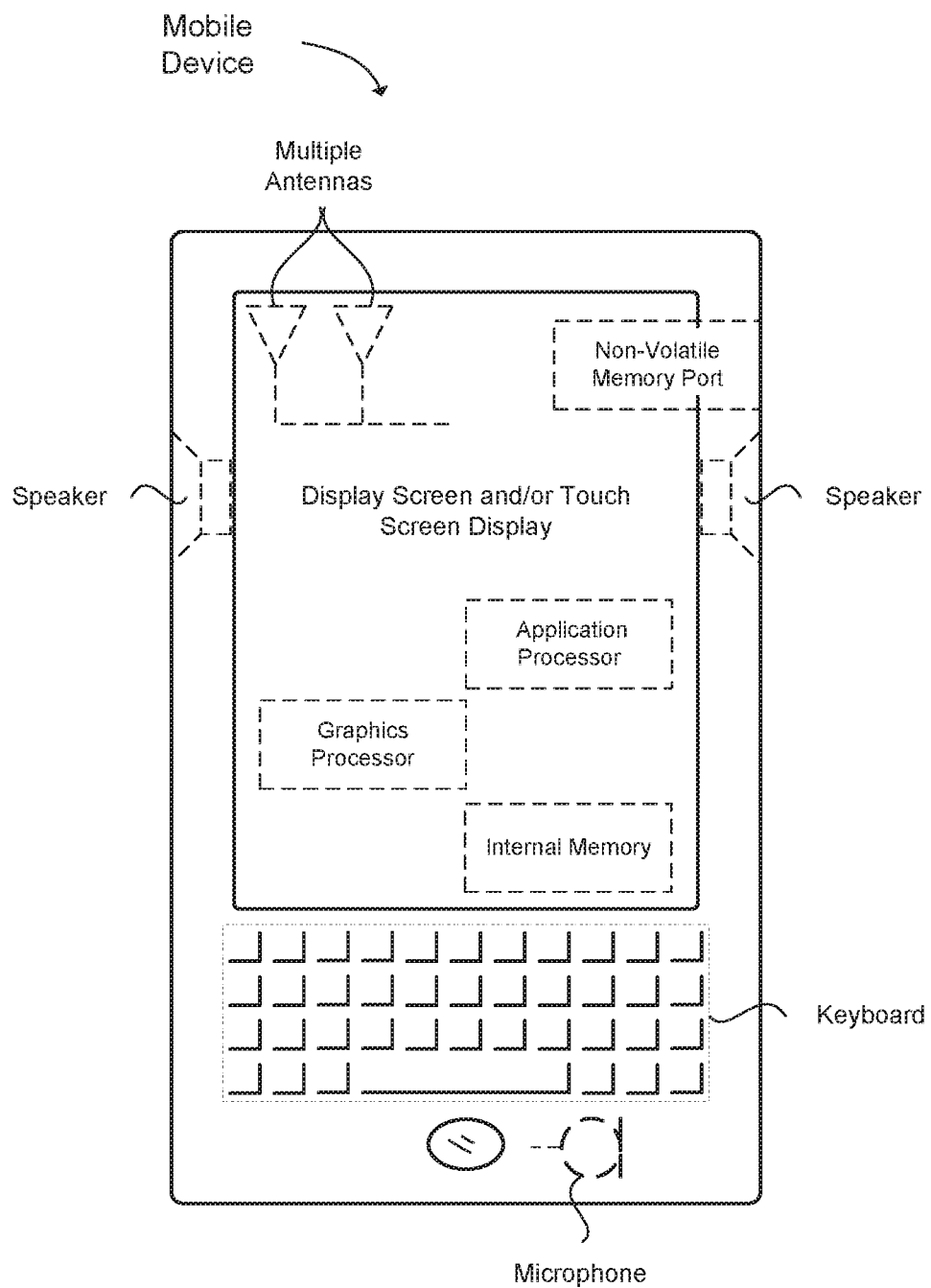
FIG. 8 illustrates a user equipment (UE) in accordance with another example.

FIG. 8 provides an example illustration of the wireless user device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

EXAMPLES

The following examples pertain to specific technology embodiments and point out specific features, elements, or actions that can be used or otherwise combined in achieving such embodiments.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A repeater system comprising:
 a repeater comprising:
  a donor port configured to be coupled to a donor antenna to communicate one or more radio frequency (RF) communications signals;
  a server port;
  a first direction amplification and filtering path coupled between the donor port and the server port;
  a second direction amplification and filtering path coupled between the donor port and the server port;
  a signal splitter communicatively coupled to the server port and having at least first and second signal splitter ports;
  the first signal splitter port being configured to be communicatively coupled to one or more of:
   a first cradle having a first interface capable of selectively carrying a first wireless user device and a first RF signal coupler configured to wirelessly couple the one or more RF communication signals to the first wireless user device carried by the first interface of the first cradle; or
   a first direct connect device; and
  the second signal splitter port being configured to be communicatively coupled to one or more of:
   a second cradle with a second interface capable of selectively carrying a second wireless user device and a second RF signal coupler; or
   a server antenna; or
   a second direct connect device; and
  the repeater system having a predetermined maximum gain of the one or more RF communications signals at the first signal splitter port or the second signal splitter port relative to the one or more RF communications signals at the donor port.

2. The system of claim 1, wherein the signal splitter is integrated into the repeater.

3. The system of claim 1, wherein the repeater system is configured to provide a maximum gain of:
 23 decibels (dB) for the first cradle or the second cradle;
 15 dB for the first direct connect device or the second direct connect device;
 50 dB for the server antenna in a moving vehicle; or
 65-72 dB for the server antenna in a stationary vehicle or a building.

4. The system of claim 1, further comprising:
 a second cradle coupled to the second signal splitter port of the signal splitter and having the second interface capable of selectively carrying the second wireless user device; and
 a second RF signal coupler configured to wirelessly couple the one or more RF communication signals to the second wireless user device when the second wireless user device is carried by the second cradle.

5. The system of claim 4, wherein:
 the first and second cradles comprise a single, shared housing; or
 the first and second interfaces are disposed adjacent one another in the shared housing; or
 the repeater is disposed in the shared housing; or
 the first and second signal splitter ports of the signal splitter are equidistance from the repeater; and wherein the signal splitter is configured such that a power of the one or more RF communication signals is substantially the same at the first and second signal splitter ports of the signal splitter; or
 the first wireless user device comprises a cellular phone; and wherein the second wireless user device comprises a wireless hotspot, or vice versa.

6. The system of claim 1, wherein the signal splitter comprises a signal tap capable of splitting the one or more RF communication signals disproportionally between at least a coupled signal path to the first signal splitter port, and a second signal path to the second signal splitter port; and wherein a power or system gain of the one or more RF communication signals at the second signal splitter port is greater than a power or system gain of the one or more RF communication signals at the first signal splitter port.

7. The system of claim 1, wherein the signal splitter comprises n signal splitter ports, where n is a positive integer greater than or equal to 2.

8. The system of claim 6, further comprising a housing; and wherein the first cradle and the signal tap are carried by the housing.

9. The system of claim 8, wherein the second signal splitter port of the signal tap is carried by the housing.

10. The system of claim 8, wherein the repeater is disposed in the housing.

11. The system of claim 1, further comprising a housing; and wherein the repeater and the signal splitter are disposed in the housing.

12. The system of claim 1, further comprising:
a housing forming the first cradle and the first interface;
the donor port carried by the housing;
the second signal splitter port carried by the housing;
the first RF signal coupler disposed in the housing adjacent to the first interface;
the repeater disposed in the housing;
the signal splitter comprising a signal tap disposed in the housing and being capable of splitting the one or more RF communication signals disproportionally between a coupled signal path to the first signal splitter port, and a second signal path to the second signal splitter port; and wherein a power or a system gain of the one or more RF communication signals at the second signal splitter port is greater than a power or a system gain of the one or more RF communication signals at the first signal splitter port.

13. The system of claim 1, further comprising:
a second repeater having a first port and a second port, wherein the first port is coupled to the second signal splitter port to enable the second repeater to provide additional gain to the one or more RF signals; or
a server antenna coupled to the second port of the second repeater.

14. A repeater system comprising:
a housing;
a repeater disposed in the housing configured to amplify one or more Radio Frequency (RF) communications signals and comprising:
a donor port coupled to the repeater and carried by the housing, and configured to be coupled to a donor antenna;
a server port;
a first direction amplification and filtering path coupled between the donor port and the server port of the repeater; and
a second direction amplification and filtering path coupled between the donor port and the server port of the repeater;
a signal splitter disposed in the housing and communicatively coupled to the server port of the repeater, the signal splitter having first and second signal splitter ports;
the signal splitter having a predetermined maximum gain at the first signal splitter port;
a first interface associated with the housing and capable of selectively carrying a first wireless user device;
a first RF signal coupler disposed in the housing adjacent to the first interface and communicatively coupled to the first signal splitter port of the signal splitter, and configured to wirelessly couple the one or more RF communication signals to the first wireless user device carried by the first interface of the first cradle; and
the second signal splitter port being configured to be communicatively coupled to one or more of:
a second cradle with a second interface capable of selectively carrying a second wireless user device and a second RF signal coupler; or
a server antenna.

15. The system of claim 14, wherein the repeater is configured to provide a maximum gain of 15 decibels (dB) or 23 dB at the first cradle.

16. The system of claim 14, further comprising:
a second interface associated with the cradle housing and capable of selectively carrying a second wireless user device; and
a second RF signal coupler disposed in the cradle housing adjacent to the second interface and communicatively coupled to the second signal splitter port of the signal splitter, and configured to wirelessly couple the one or more RF communication signals to the second wireless user device when carried by the second interface; or
wherein the first and second signal splitter ports of the signal splitter are equidistance from the repeater; and wherein the signal splitter is configured such that a power of the one or more RF communication signals is substantially the same at the first and second signal splitter ports of the signal splitter.

17. The system of claim 14, wherein the signal splitter comprises a signal tap capable of splitting the one or more RF communication signals disproportionally between a coupled signal path to the first signal splitter port, and a second signal path to the second signal splitter port; and wherein a power of the one or more RF communication signals at the second signal splitter port is greater than a power of the one or more RF communication signals at the first signal splitter port.

18. The system of claim 17, further comprising:
a server antenna coupled to the second signal splitter port and the second signal path, wherein a gain of the signal at the second signal splitter port relative to the donor port is 50 decibels (dB) or 65 to 72 dB.

19. The system of claim 17, wherein the repeater with the signal tap is configured to provide a signal with a maximum gain of 23 decibels (dB) at the first cradle relative to the signal at the donor port.

20. A repeater system comprising:
a housing having at least a first interface capable of selectively carrying a first wireless user device;
a repeater disposed in the housing that is configured to amplify one or more Radio Frequency (RF) communication signals, the repeater comprising:
a donor port coupled to the repeater and carried by the housing, and configured to be coupled to a donor antenna; and
a server port;
a first direction amplification and filtering path coupled between the donor port and the server port; and
a second direction amplification and filtering path coupled between the donor port and the server port;
a signal splitter disposed in the housing and communicatively coupled to the server port of the repeater and having first and second signal splitter ports;
the signal splitter being a signal tap capable of splitting the one or more RF communication signals disproportionally between a coupled path from the server port to the first signal splitter port, and a second signal path from the server port to the second signal splitter port, with the power of the one or more RF communication signals at the second signal splitter port being greater than the power of the one or more RF communication signals at the first signal splitter port;

a first interface associated with the housing and capable of selectively carrying a first wireless user device;

a first RF signal coupler disposed in the housing adjacent to the first interface and communicatively coupled to the first signal splitter port of the signal splitter, and configured to wirelessly couple the one or more RF communication signals to a first wireless user device carried by the first interface; and the second signal splitter port being carried by the housing and being configured to be communicatively coupled to one or more of: a second cradle with a second interface capable of selectively carrying a second wireless user device and a second RF signal coupler; or a server antenna.

21. The repeater system of claim 20, wherein a signal gain at the second signal splitter port relative to the donor port is 23 decibels (dB), or 50 dB or 65 to 72 dB.

22. The repeater system of claim 20, wherein a signal gain at the first signal splitter port relative to the donor port is 15 decibels (dB) or 23 dB.

23. A repeater system comprising:

a housing;

a first repeater disposed in the housing, that is configured to amplify one or more Radio Frequency (RF) communication signals, the first repeater comprising:

a first donor port coupled to the first repeater and carried by the housing, and configured to be coupled to a donor antenna;

a first server port;

a $1^{st}$ first direction amplification and filtering path coupled between the first donor port and the first server port; and a $1^{st}$ second direction amplification and filtering path coupled between the first donor port and the first server port;

a signal splitter disposed in the housing and communicatively coupled to the server port of the first repeater, the signal splitter having first and second signal splitter ports;

the signal splitter having a predetermined maximum gain at the first signal splitter port and the second signal splitter port;

a first interface associated with the housing and capable of selectively carrying a first wireless user device, wherein the first interface is communicatively coupled to the first signal splitter port;

a second repeater, having a second donor port coupled to the second signal splitter port, the second repeater configured to provide additional gain relative to the second signal splitter port;

a second server port coupled to the second repeater and configured to be coupled to a server antenna;

a $2^{nd}$ first direction amplification and filtering path coupled between the second donor port and the second server port; and a 2nd second direction amplification and filtering path coupled between the second donor port and the second server port.

24. The repeater system of claim 23, wherein a gain at the first signal splitter port relative to the first donor port is 23 decibels (dB).

25. The repeater system of claim 23, wherein a gain at the second server port relative to the first donor port is 23 decibels (dB) or 50 dB or 65 to 72 dB.

* * * * *